US009104360B2

(12) United States Patent  
Suzuki

(10) Patent No.: US 9,104,360 B2
(45) Date of Patent: Aug. 11, 2015

(54) TERMINAL APPARATUS INTERACTING WITH A FUNCTION EXECUTING APPARATUS TO PERFORM SCAN FUNCTIONS USING DIFFERENT COMMUNICATION SCHEMES

(71) Applicant: Takanobu Suzuki, Nagoya (JP)

(72) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/191,476

(22) Filed: Feb. 27, 2014

(65) Prior Publication Data

US 2014/0240773 A1 Aug. 28, 2014

(30) Foreign Application Priority Data

Feb. 28, 2013 (JP) ................................. 2013-040085

(51) Int. Cl.
*G06F 3/12* (2006.01)
*H04W 4/00* (2009.01)
(Continued)

(52) U.S. Cl.
CPC ............ *G06F 3/1292* (2013.01); *G06F 3/1236* (2013.01); *H04N 1/00204* (2013.01); *H04N 1/00244* (2013.01); *H04N 1/00307* (2013.01); *H04N 1/00347* (2013.01); *H04N 1/00413* (2013.01); *H04N 1/00474* (2013.01);
(Continued)

(58) Field of Classification Search
CPC .......... H04N 1/00225; H04N 1/00244; H04N 1/00307; H04N 1/00408; H04N 1/00413; H04N 1/00416; H04N 1/00421; H04N 1/00432; H04N 1/00474; H04N 1/00973; H04N 2201/0036; H04N 2201/0039; H04N 2201/0041; H04N 2201/0044; H04N 2201/0055; H04N 2201/0096; H04N 1/00204; H04N 1/00407; H04N 1/33353; H04N 2201/0043; H04N 2201/006; H04W 4/00; H04W 4/02; H04W 16/14; H04W 48/18; H04W 84/12; G03F 3/1236; G03F 3/1292
USPC ..................... 358/1.15; 455/41.2, 67.11, 450; 370/338, 445
See application file for complete search history.

(56) References Cited

U.S. PATENT DOCUMENTS 6,636,738 B1 * 10/2003 Hayashi ........................ 455/450
8,159,706 B2 * 4/2012 Kato ............................ 358/1.15
(Continued)

FOREIGN PATENT DOCUMENTS

| JP | 2007-096445 A | 4/2007 |
| JP | 2007-166538 A | 6/2007 |
| JP | 2011-146991 A | 7/2011 |

OTHER PUBLICATIONS

Co-Pending U.S. Appl. No. 14/191,474, filed Feb. 27, 2014.
(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

A terminal apparatus may receive first information relating to a first function executing apparatus from the first function executing apparatus. The first function executing apparatus may be configured to execute a scan function. The terminal apparatus may cause a display mechanism of the terminal apparatus to display a first image indicating M1 items of communication schemes by using the first information. Each of the M1 items of communication schemes may be a communication scheme available for the first function executing apparatus to send scan data.

18 Claims, 16 Drawing Sheets

(51) Int. Cl.
*H04M 1/00* (2006.01)
*H04N 1/327* (2006.01)
*H04N 1/00* (2006.01)
*H04N 1/333* (2006.01)

(52) U.S. Cl.
CPC ....... *H04N1/00973* (2013.01); *H04N 1/32773* (2013.01); *H04N 1/33323* (2013.01); *H04N 1/33353* (2013.01); *H04N 2201/006* (2013.01); *H04N 2201/0013* (2013.01); *H04N 2201/0015* (2013.01); *H04N 2201/0036* (2013.01); *H04N 2201/0039* (2013.01); *H04N 2201/0041* (2013.01); *H04N 2201/0043* (2013.01); *H04N 2201/0055* (2013.01); *H04N 2201/0075* (2013.01); *H04N 2201/0081* (2013.01); *H04N 2201/0094* (2013.01); *H04N 2201/0096* (2013.01)

(56) References Cited

U.S. PATENT DOCUMENTS

| | | | |
|---|---|---|---|
| 8,625,488 B1* | 1/2014 | Gogate et al. | 370/328 |
| 8,665,480 B2 | 3/2014 | Wada et al. | |
| 2002/0051197 A1 | 5/2002 | Minegishi | |
| 2007/0041036 A1 | 2/2007 | Nakayama | |
| 2007/0280122 A1 | 12/2007 | Ito | |
| 2009/0092106 A1 | 4/2009 | Nakayama | |
| 2010/0081385 A1 | 4/2010 | Lin et al. | |
| 2010/0149602 A1* | 6/2010 | Tamai et al. | 358/403 |
| 2011/0170686 A1 | 7/2011 | Goto | |
| 2011/0177780 A1 | 7/2011 | Sato et al. | |
| 2011/0317211 A1* | 12/2011 | Yamada et al. | 358/1.15 |
| 2012/0081745 A1 | 4/2012 | Asai | |
| 2013/0229673 A1 | 9/2013 | Nakayama et al. | |
| 2013/0250354 A1* | 9/2013 | Kato et al. | 358/1.15 |

OTHER PUBLICATIONS

Co-Pending U.S. Appl. No. 14/191,510, filed Feb. 27, 2014.
Co-Pending U.S. Appl. No. 14/191,513, filed Feb. 27, 2014.
Jul. 30, 2014—(US) Non-Final Office Action—U.S. Appl. No. 14/191,474.
Aug. 19, 2014—(US) Non-Final Office Action—U.S. Appl. No. 14/191,510.
Jul. 24, 2014—(EP) Extended Search Report—App 14157087.9.
Aug. 20, 2014—(US) Non-Final Office Action—U.S. Appl. No. 14/191,513.

* cited by examiner (First Embodiment)
(Scan Function Which MFP is Capable of Executing)

(First Embodiment)

(Scan Function Which MFP is Capable of Executing)

(First Embodiment)

FIG. 9
(First Embodiment)
(Case A)
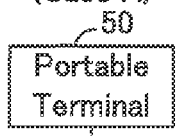
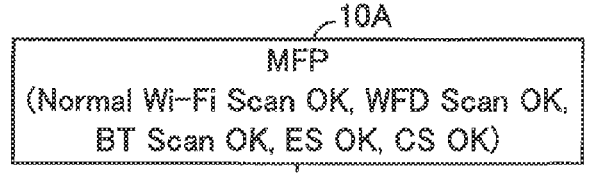
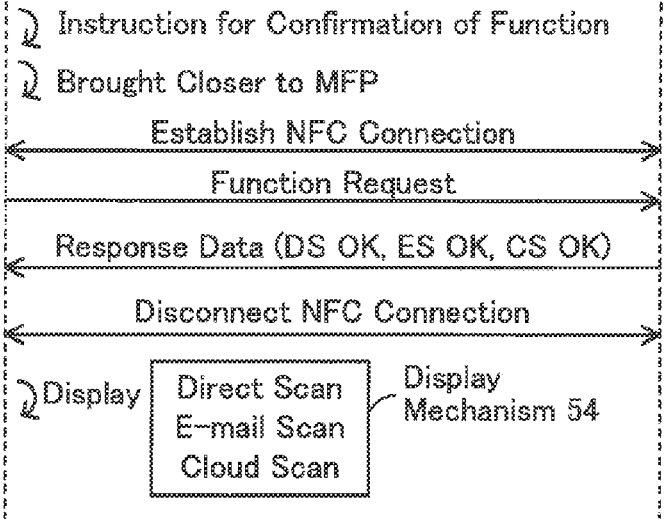
(Case B)
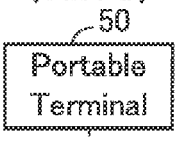
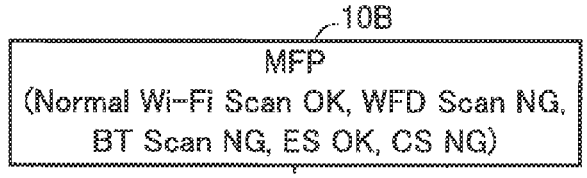
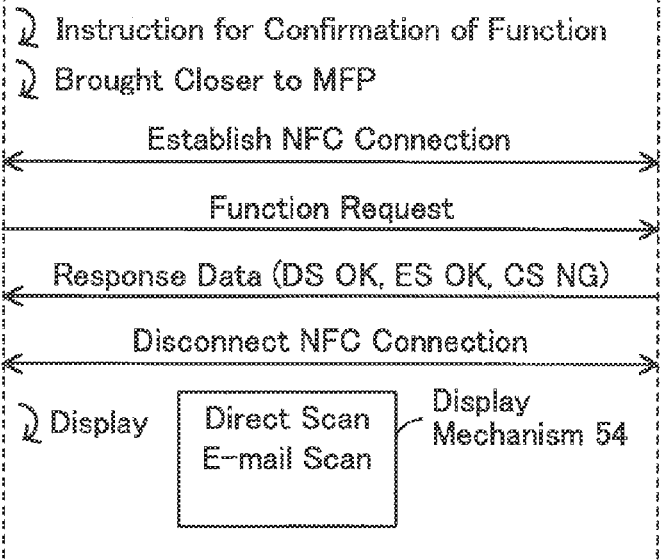

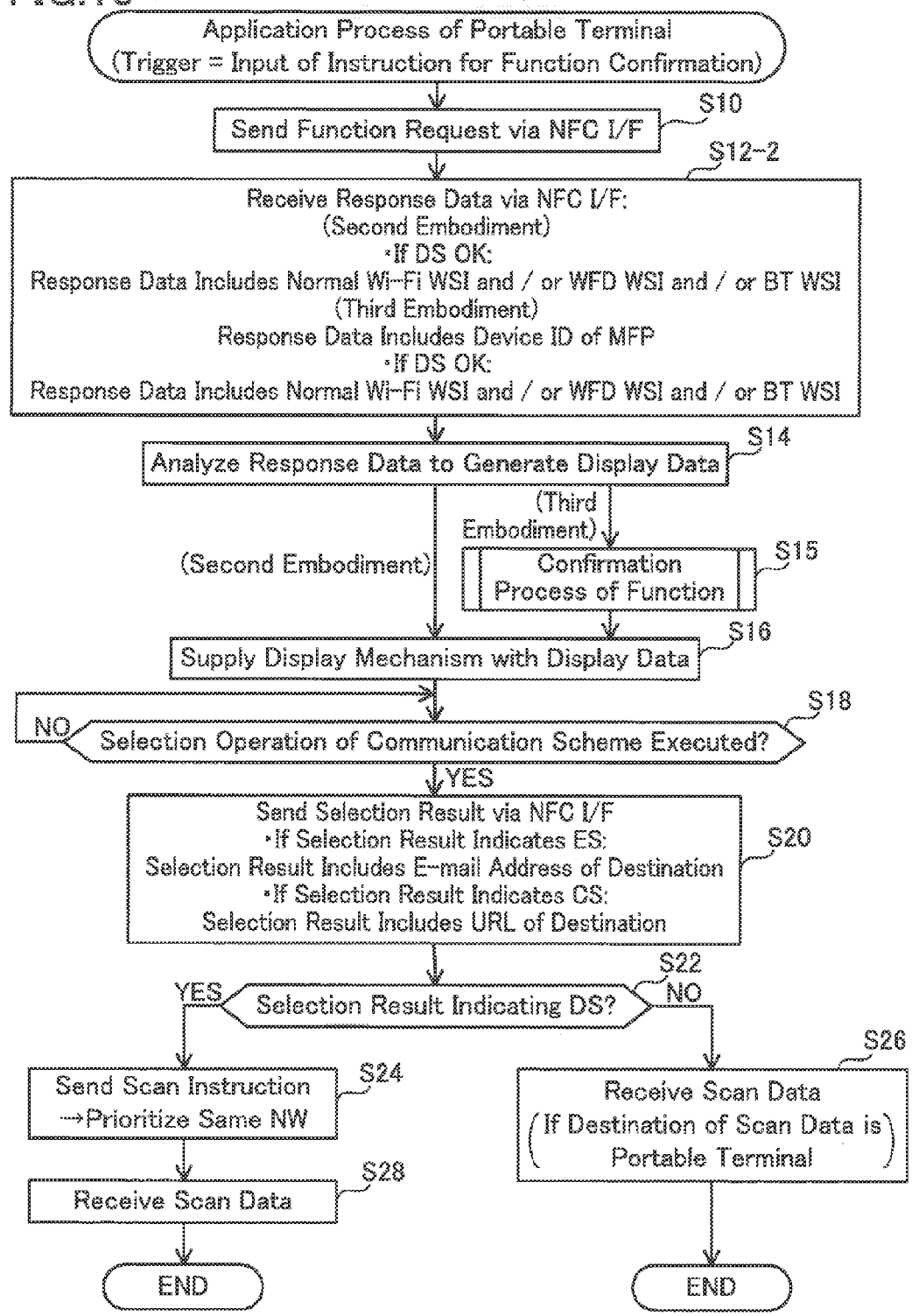

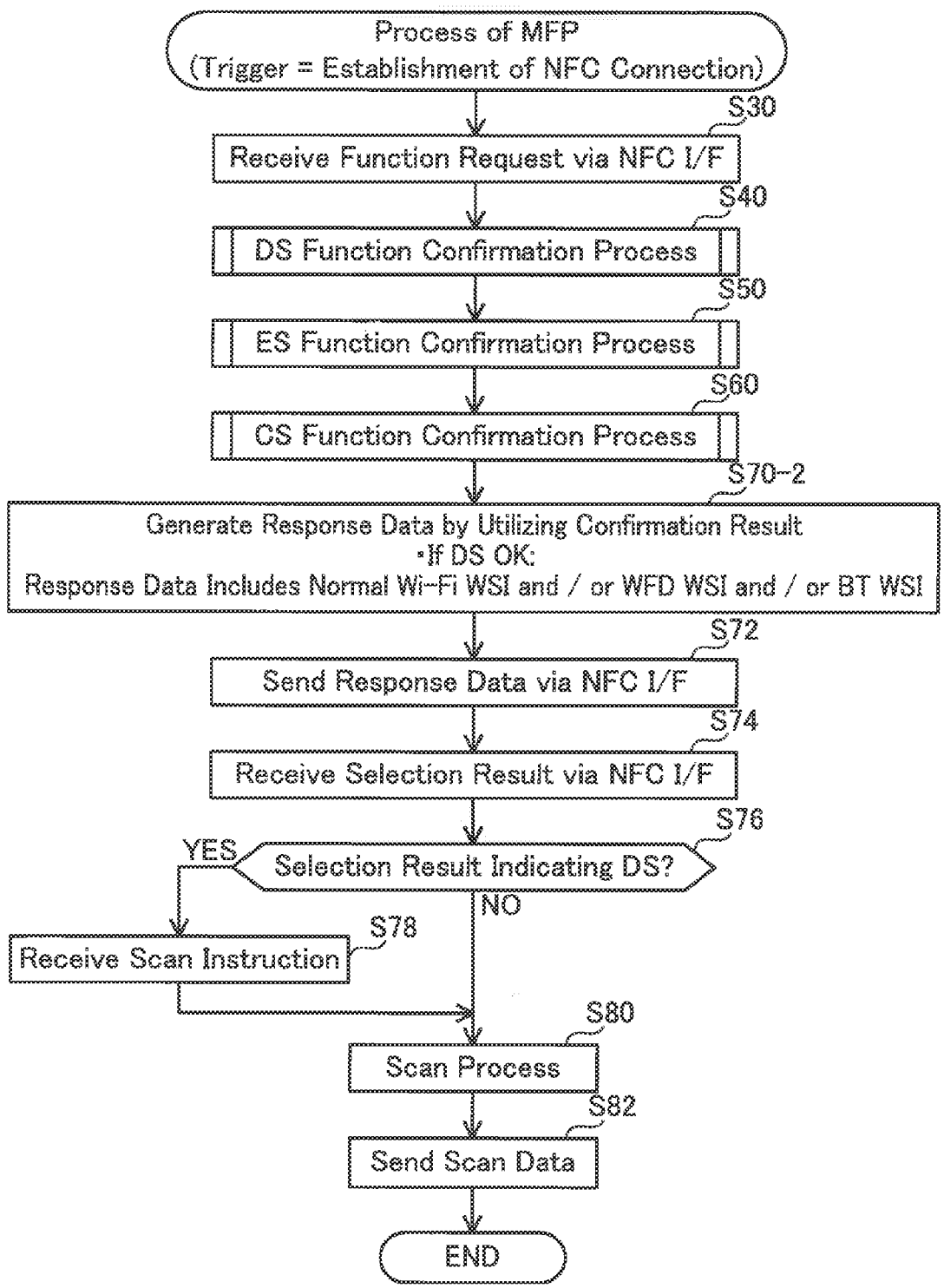
FIG.11 (Second and Third Embodiments)

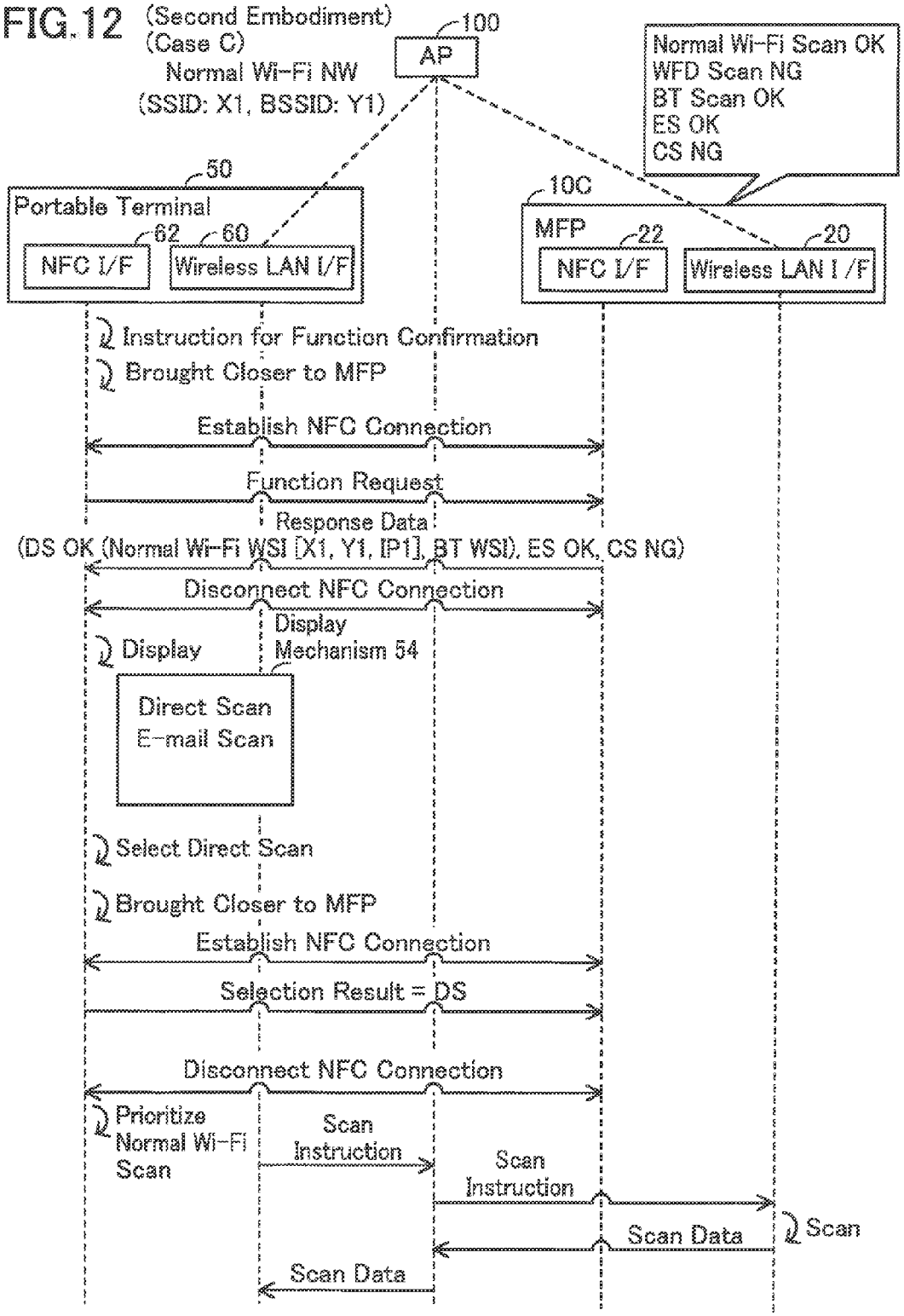

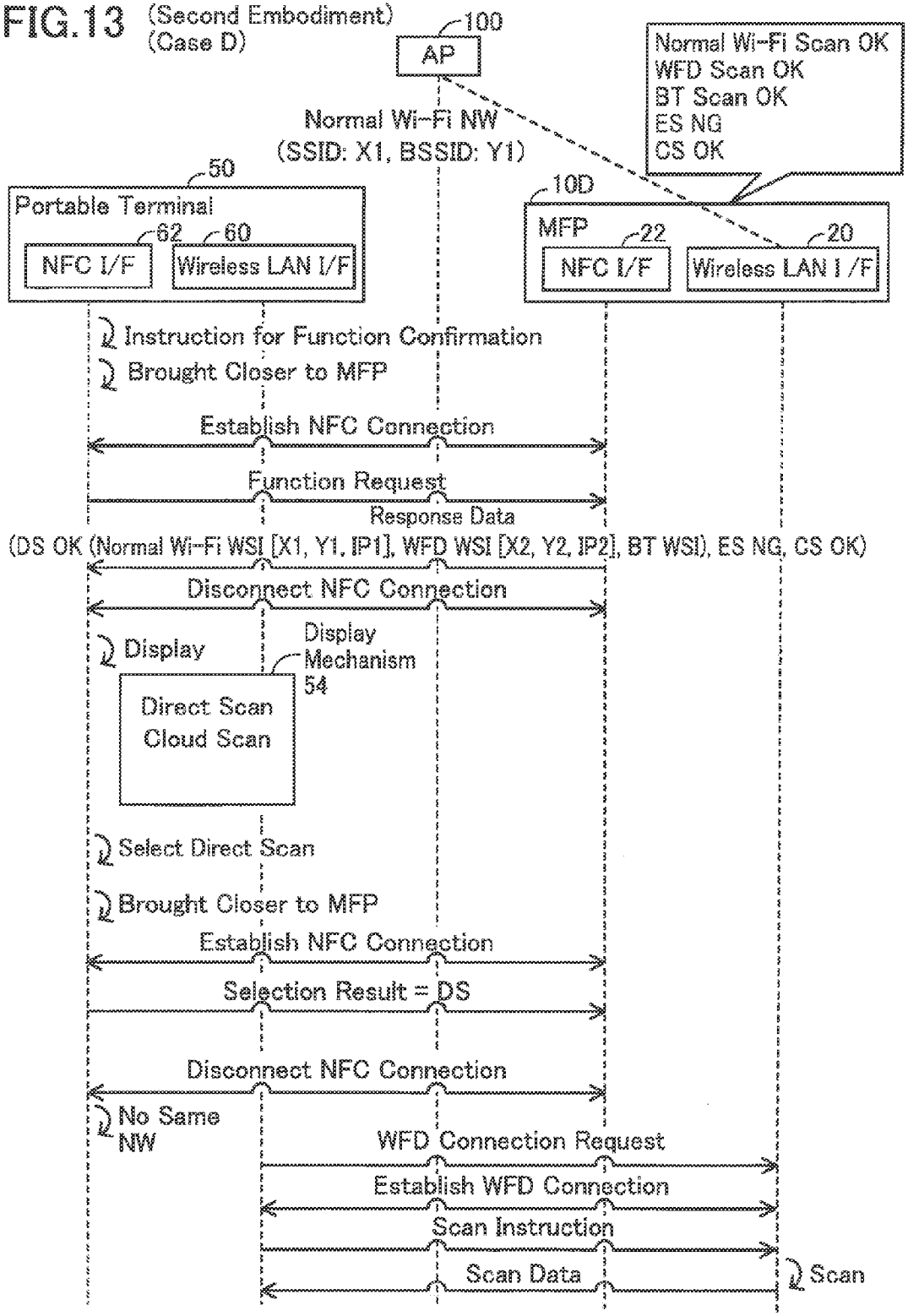

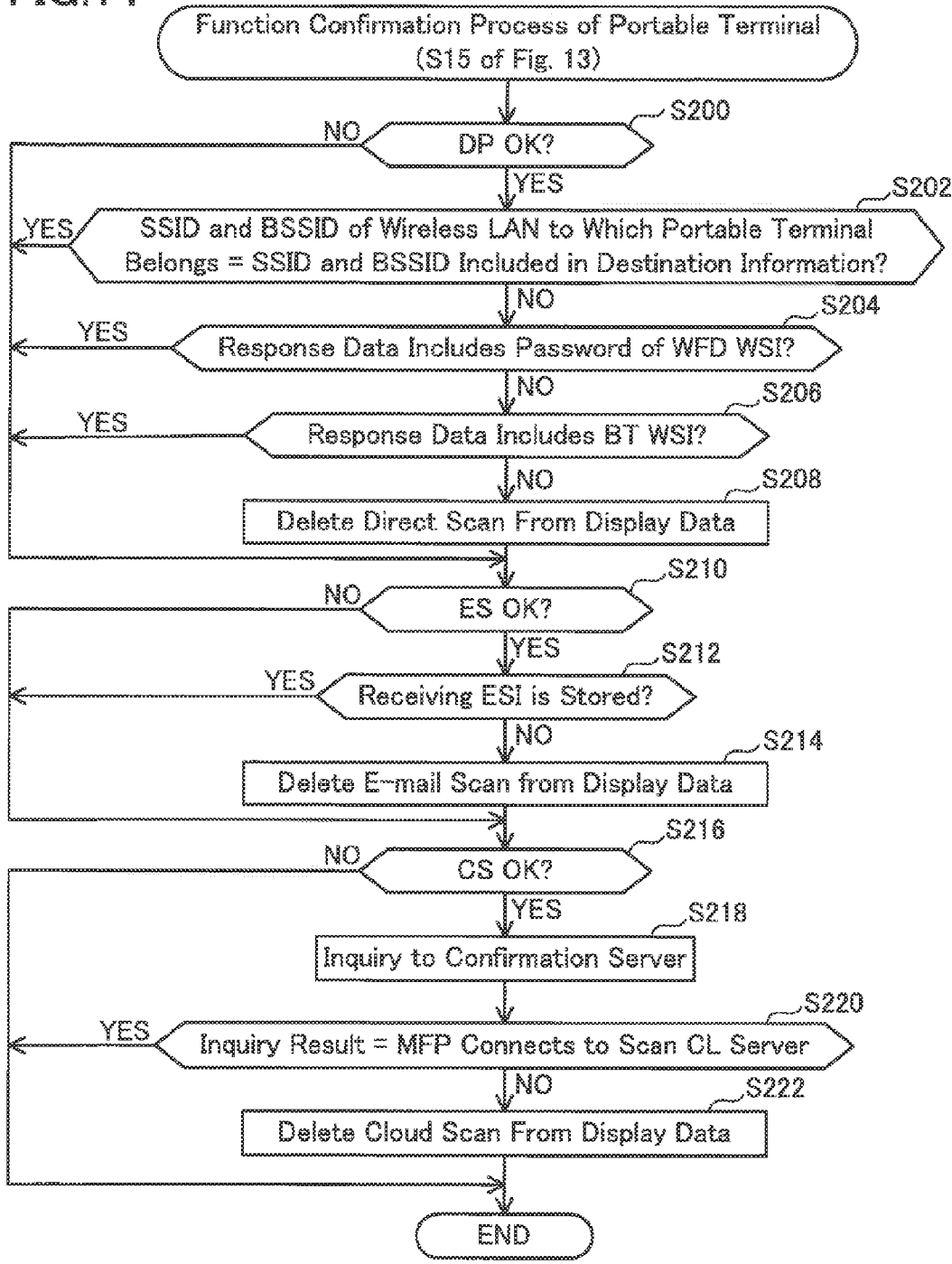

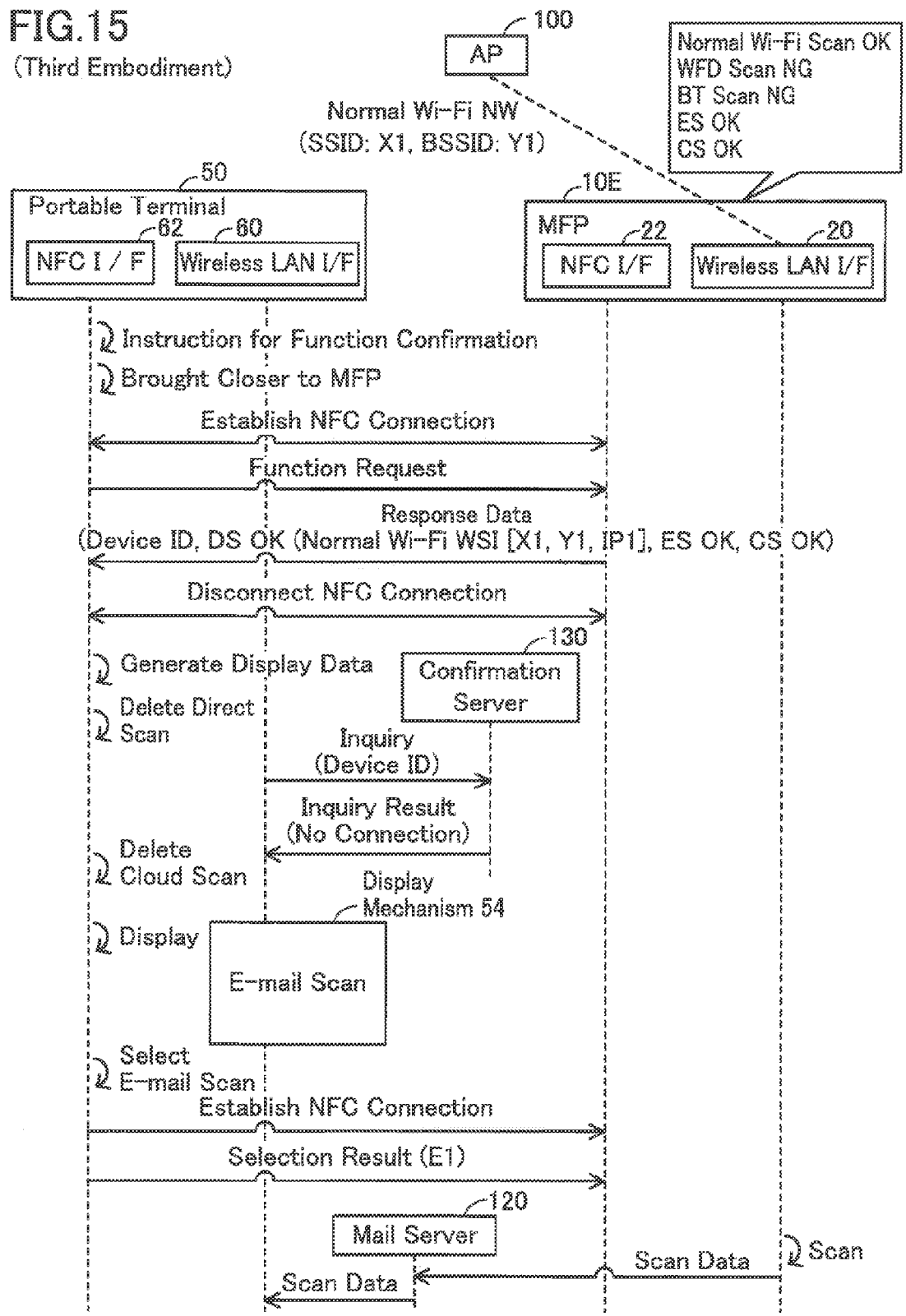

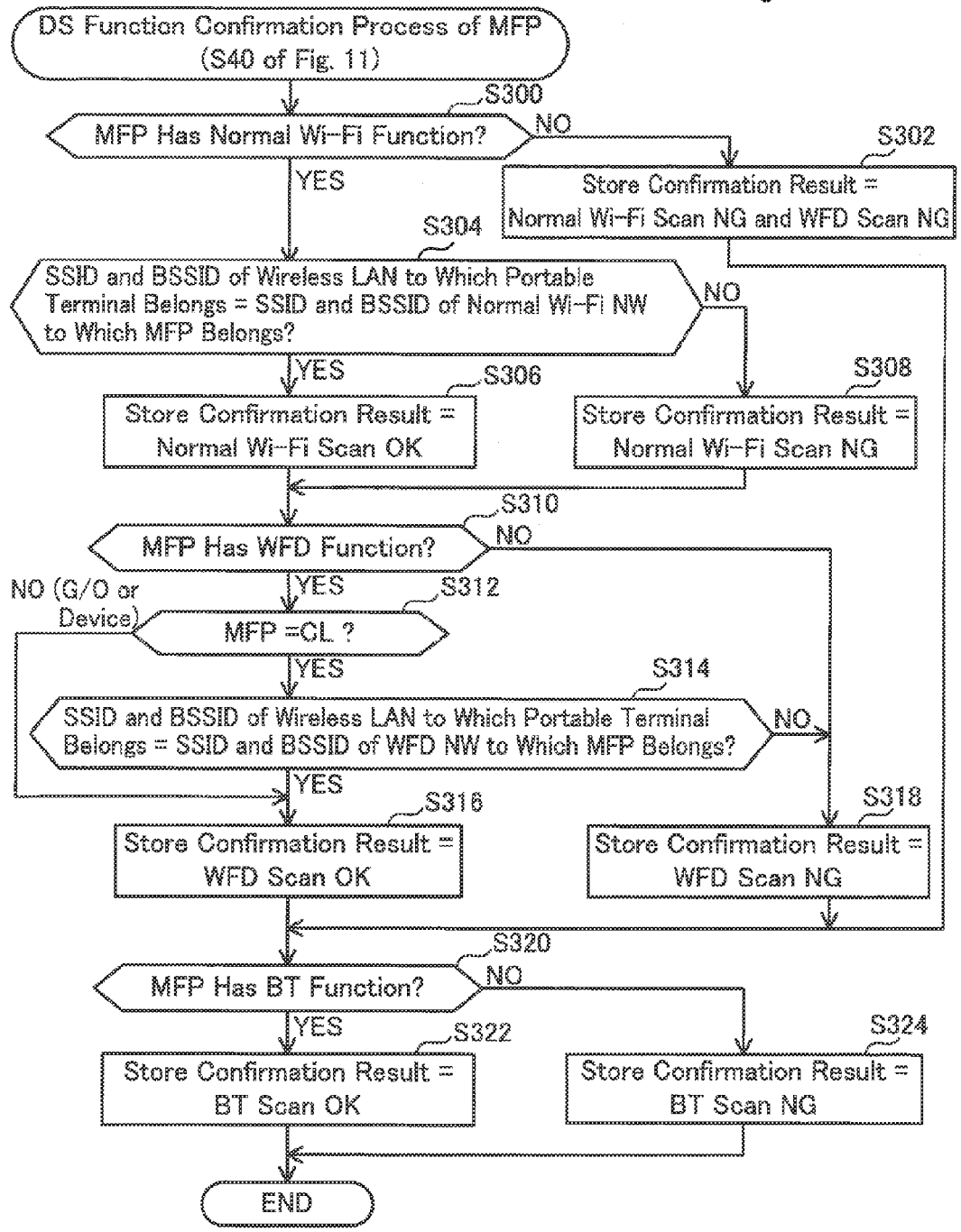

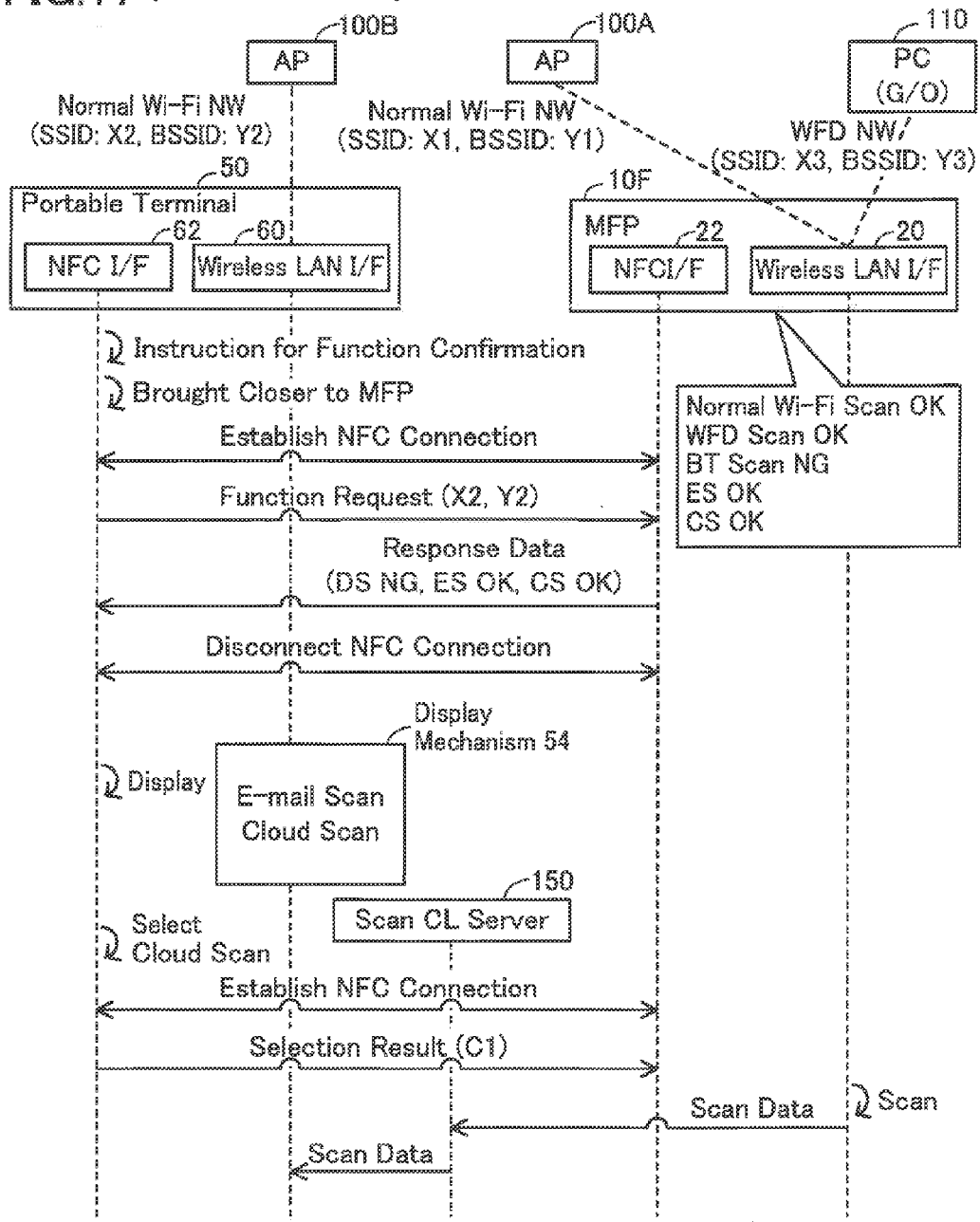

TERMINAL APPARATUS INTERACTING WITH A FUNCTION EXECUTING APPARATUS TO PERFORM SCAN FUNCTIONS USING DIFFERENT COMMUNICATION SCHEMES

CROSS-REFERENCE TO RELATED APPLICATIONS

This application claims priority to Japanese Patent Application No. 2013-040085, filed on Feb. 28, 2013, the contents of which are hereby incorporated by reference into the present application.

TECHNICAL FIELD

The present specification discloses a function executing apparatus capable of executing a scan function, and a terminal apparatus capable of communicating with the function executing apparatus.

DESCRIPTION OF RELATED ART

A telephone system provided with a plurality of wireless telephones and a telephone control apparatus is known. Upon detecting a channel number which a wireless LAN base station has started to use, the telephone control apparatus notifies the each wireless telephone of the channel number. The each wireless telephone uses the notified channel number.

SUMMARY

A technique which may increase user convenience is taught in the present specification.

One aspect disclosed in the present specification may be a terminal apparatus. The terminal apparatus may comprise: a processor; and a memory storing computer-readable instructions therein. The computer-readable instructions, when executed by the processor, may cause the terminal apparatus to perform: receiving first information relating to a first function executing apparatus from the first function executing apparatus, the first function executing apparatus being configured to execute a scan function; and causing a display mechanism of the terminal apparatus to display a first image indicating M1 items of communication schemes by using the first information, the M1 being an integer of one or more, each of the M1 items of communication schemes being a communication scheme available for the first function executing apparatus to send scan data.

One aspect disclosed in the present specification may be a function executing apparatus configured to execute a scan function. The function executing apparatus may comprise: a processor, and a memory storing computer-readable instructions therein. The computer-readable instructions, when executed by the processor, may cause the function executing apparatus to perform: specifying M1 items of communication schemes from among a plurality of communication schemes, the M1 being an integer of one or more, each of the M1 items of communication schemes being a communication scheme available for the function executing apparatus to send scan data; and sending first information indicating the M1 items of communication schemes to a terminal apparatus.

Moreover, a control method, a computer program, and a non-transitory computer-readable recording medium that stores the computer program, all for realizing the terminal apparatus and the function executing apparatus respectively, are also novel and useful. Further, a communication system comprising the terminal apparatus and the function executing apparatus is also novel and useful.

BRIEF DESCRIPTION OF THE DRAWINGS

FIG. 9 shows a sequence view of processes executed by devices of the first embodiment.

FIG. 10 shows a flowchart of an application process of a portable terminal of second and third embodiments.

FIG. 11 shows a flowchart of a process of an MFP of the second and third embodiments.

FIG. 12 shows a sequence view of processes executed by devices of the second embodiment.

FIG. 13 shows a sequence view of processes executed by devices of the second embodiment.

FIG. 14 shows a flowchart of a function confirmation process of a portable terminal of the third embodiment.

FIG. 15 shows a sequence view of processes executed by devices of the third embodiment.

FIG. 16 shows a flowchart of a DS function confirmation process of a fourth embodiment.

FIG. 17 shows a sequence view of processes executed by devices of the fourth embodiment.

EMBODIMENT

First Embodiment
(Structure of Communication System 2)

Figure 1:
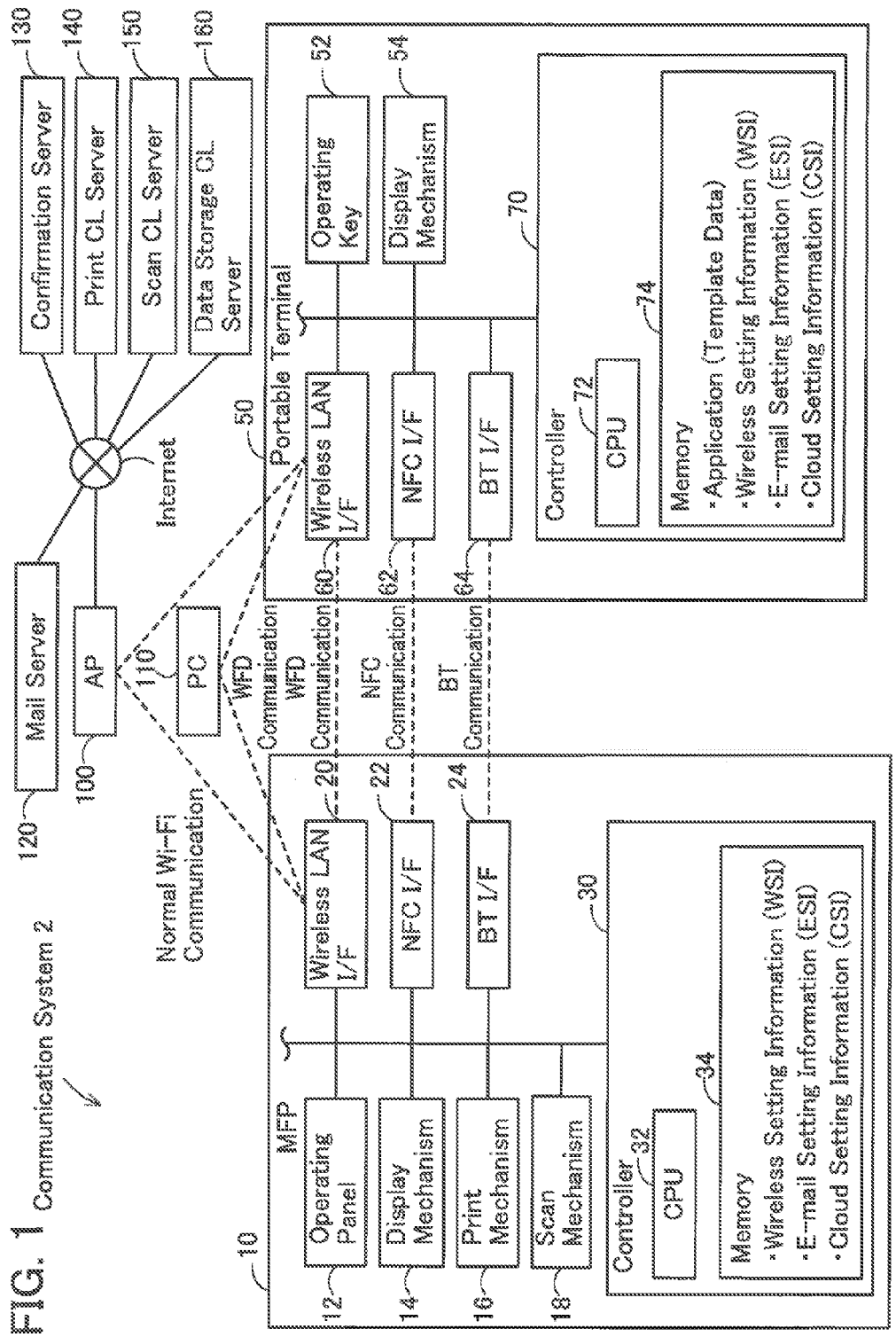
FIG. 1 shows the structure of a communication system.

As shown in FIG. 1, a communication system 2 comprises a multi-function peripheral (called "MFP (abbreviation of Multi-Function Peripheral)" below) 10, a portable terminal 50, an access point (called "AP (abbreviation of Access Point)" below) 100, a PC (abbreviation of Personal Computer) 110, a mail server 120, a confirmation server 130, a print CL server 140, a scan CL server 150, and a data storage CL server 160.

(Structure of MFP 10)

The MFP 10 is a peripheral device (e.g., a peripheral device of the PC 110) capable of executing multiple functions including a print function and a scan function. The MFP 10 comprises an operating panel 12, a display mechanism 14, a print mechanism 16, a scan mechanism 18, a wireless LAN (abbreviation of Local Area Network) interface 20, an NFC (abbreviation of Near Field Communication) interface 22, a BT (abbreviation of Blue Tooth (registered trademark)) interface 24, and a controller 30. The units 12 to 30 are connected with a bus line (reference number omitted). Below, interface is referred to as "I/F".

The operating panel 12 comprises a plurality of keys. A user can give various instructions to the MFP 10 by operating the operating panel 12. The display mechanism 14 is a display for showing various types of information. The print mechanism 16 is a print mechanism such as an ink jet method, laser method. The scan mechanism 18 is a scan mechanism such as a CCD or CIS.

The wireless LAN I/F 20 is an interface for executing a wireless communication, and is physically one interface (i.e., one IC chip). However, a MAC address (called "WFD MAC" below) used in wireless communication (called "WFD communication" below) according to a WED (abbreviation of Wi-Fi Direct) scheme, and a MAC address (called "normal Wi-Fi MAC" below) used in wireless communication (called "normal Wi-Fi communication" below) according to a normal Wi-Fi scheme both be assigned to the wireless LAN I/F 20.

Specifically, a normal Wi-Fi MAC is assigned in advance to the wireless LAN I/F 20. By using the normal Wi-Fi MAC, the controller 30 generates a WFD MAC which is different from the normal Wi-Fi MAC, and assigns the WFD MAC to the wireless LAN I/F 20. Consequently, the controller 30 can simultaneously execute both a normal Wi-Fi communication using the normal Wi-Fi MAC, and a WFD communication using the WFD MAC. The WFD communication and the normal Wi-Fi communication will be described in detail later.

The NFC I/F 22 is an interface for executing NFC communication. NFC communication is a wireless communication according to an NFC scheme for so-called short distance wireless communication. The NFC scheme is a wireless communication scheme based on e.g., international standards ISO/IEC21481 or 18092.

The BT I/F 24 is an interface for executing BT communication. BT communication is a wireless communication according to a BT scheme for a so-called short distance wireless communication. The BT scheme is a wireless communication scheme based on e.g., standard IEEE802.15.1. A chip configuring the wireless LAN I/F 20, a chip configuring the NFC I/F 22, and a chip configuring the BT I/F 24 are physically different. Moreover, in the present embodiment, each of the three I/Fs are configured as different chips. However, in a variant, the wireless LAN I/F 20, the NFC I/F 22, and the BT I/F 24 may be configured as one chip, or two of the three I/Fs may be configured as one chip.

A communication speed (e.g., maximum communication speed is 11 to 600 Mbps) of a wireless communication (i.e., normal Wi-Fi communication and WFD communication) using the wireless LAN I/F 20 is faster than a communication speed (e.g., maximum communication speed is 24 Mbps) of a wireless communication via the BT I/F 24 (i.e., BT communication). The communication speed of a wireless communication via the BT I/F 24 (i.e., BT communication) is faster than a communication speed (e.g., maximum communication speed is 100 to 424 Kbps) using the NFC I/F 22. That is, the communication speed of the wireless communication is fastest for the wireless LAN I/F 20, second fastest for the BT I/F 24, and slowest for the NFC I/F 22.

Frequency of a carrier wave in a wireless communication via the wireless LAN I/F 20 is, e.g., 2.4 GHz band or 5.0 GHz band. Frequency of a carrier wave in a wireless communication via the NFC I/F 22 is, e.g., 13.56 MHz band. Frequency of a carrier wave in a wireless communication via the BT I/F 24 is, e.g., 2.4 GHz band. That is, the frequency of the carrier wave is different for the wireless LAN I/F 20 and the NFC I/F 22, and is different for the NFC I/F 22 and the BT I/F 24. Further, in a case where the frequency of the carrier wave of the wireless LAN I/F 20 is 5.0 GHz band, the frequency of the carrier wave differs between the wireless LAN I/F 20 and the BT I/F 24.

A maximum distance (e.g., approximately 100 m) across which the MFP 10 can execute a wireless communication with a communication destination device (e.g., the portable terminal 50) via the wireless LAN I/F 20 is greater than a maximum distance (e.g., approximately several tens of meters) across which the MFP 10 can execute a wireless communication with a communication destination device (e.g., the portable terminal 50) via the BT I/F 24. Further, a maximum distance (e.g., approximately several tens of meters) across which the MFP 10 can execute a wireless communication with a communication destination device (e.g., the portable terminal 50) via the BT I/F 24 is greater than a maximum distance (e.g., approximately 10 cm) across which the MFP 10 can execute a wireless communication with a communication destination device via the NFC I/F 22. That is, the communicable range of the wireless communication is greatest for the wireless LAN I/F 20, second greatest for the BT I/F 24, and smallest for the NFC I/F 22.

The controller 30 comprises a CPU 32 and a memory 34. The CPU 32 executes various processes according to a program stored in the memory 34. Further, the memory 34 can store wireless setting information (called "WSI (abbreviation of Wireless Setting Information)" below) for the MFP 10 to execute various types of communication (i.e., WFD communication, normal Wi-Fi communication, BT communication), E-mail setting information (called "ESI (abbreviation of E-mail Setting Information)" below) for the MFP 10 to execute E-mail (abbreviation of Electronic Mail) communication, and cloud setting information (called "CSI (abbreviation of Cloud Setting Information)" below) for the MFP 10 to execute communication with a cloud server (called "cloud communication" below). Moreover, the E-mail communication or cloud communication may be executed via the wireless LAN I/F 20, or may be executed via another I/F, which is not shown (e.g., a wired LAN I/F, etc.).

(Structure of Portable Terminal 50)

The portable terminal 50 is a portable terminal apparatus such as a mobile phone (e.g., a Smart Phone), PDA, notebook PC, tablet PC, portable music playback device, portable video playback device, etc. The portable terminal 50 comprises an operating key 52, a display mechanism 54, a wireless LAN I/F 60, an NFC I/F 62, a BT I/F 64, and a controller 70. The units 52 to 70 are connected to a bus line (reference number omitted).

The user can give various instructions to the portable terminal 50 by operating the operating key 52. The display mechanism 54 is a display for displaying various types of information. The I/Fs 60, 62, 64 are the same as the I/Fs 20, 22, 24 of the MFP 10. Consequently, the differences between the I/Fs 60, 62, 64 are the same as the differences between the I/Fs 20, 22, 24.

The controller 70 comprises a CPU 72 and a memory 74. The CPU 72 executes various processes according to a program stored in the memory 74. The memory 74 stores an application (called "MFP application" below) for causing the MFP 10 to execute a function (e.g., print function, scan function, etc.). The MFP application may, e.g., be installed on the portable terminal 50 from a server provided by a vendor of the MFP 10, or may be installed on the portable terminal 50 from a media shipped together with the MFP 10.

Further, the memory 74 can store WSI for the portable terminal 50 to execute various types of communication (WFD communication, normal Wi-Fi communication, BT communication), ESI for the portable terminal 50 to execute E-mail communication, and CSI for the portable terminal 50 to execute cloud communication. Moreover, the E-mail communication or the cloud communication may be executed via the wireless LAN I/F 60, or may be executed via another I/F, which is not shown (e.g., a wired LAN I/F, an I/F for connecting to a cellular network (e.g., 3G, 4G), etc.).

(Structure of Other Apparatuses 100 to 160)

The AP 100 is a standard access point called a wireless access point, wireless LAN router, etc., and is different from a WFD scheme G/O device (to be described). The AP 100 can form a normal Wi-Fi network (to be described). The AP 100 comprises a router function that is connected to the Internet and that relays communication between the Internet and the normal Wi-Fi network formed by the AP 100. Moreover, below, a network may be described as "NW".

The PC 110 is a known computer that operates according to an OS program. The PC 110 can execute a WFD communication according to the WFD scheme.

The servers 120 to 160 are connected with the Internet. The mail server 120 includes an SMTP (abbreviation of Simple Mail Transfer Protocol) server, and a POP (abbreviation of Post Office Protocol) server. The mail server 120 relays the communication of electronic mail in a case where sending of electronic mail from one communication device (e.g., the portable terminal 50) to another communication device (e.g., the MFP 10) is to be executed.

The confirmation server 130, the print CL (abbreviation of Cloud) server 140, and the scan CL server 150 are each servers provided by e.g., the vendor of the MFP 10. The confirmation server 130 sends a response signal to the MFP 10 in case of receiving a signal from the MFP 10. Further, in case of receiving a signal from the portable terminal 50, the confirmation server 130 sends a response signal to the portable terminal 50. In a case where sending of print data from a communication device (e.g., the portable terminal 50) to the MFP 10 is to be executed, the print CL server 140 relays the communication of the print data. The scan CL server 150, in a case where sending of scan data from the MFP 10 to a communication device (e.g., the portable terminal 50) is to be executed, relays the communication of the scan data.

The data storage CL server 160 is a known server such as, e.g., FACEBOOK (registered trademark), GOOGLE DOCS (registered trademark), PICASA (registered trademark), etc. The data storage CL server 160 receives scan data from the MFP 10, and stores the scan data.

Figure 2:
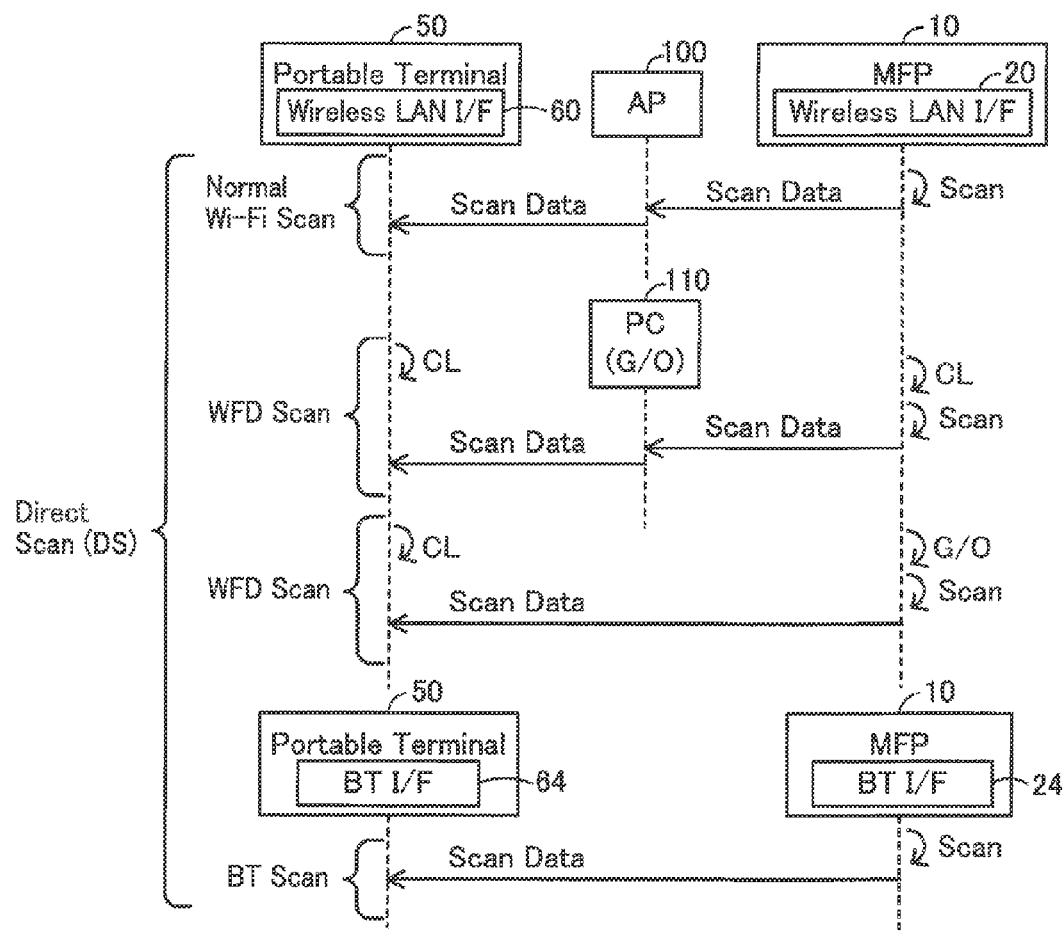
FIG. 2 shows a view for describing a scan function which an MFP is capable of executing.
Figure 3:
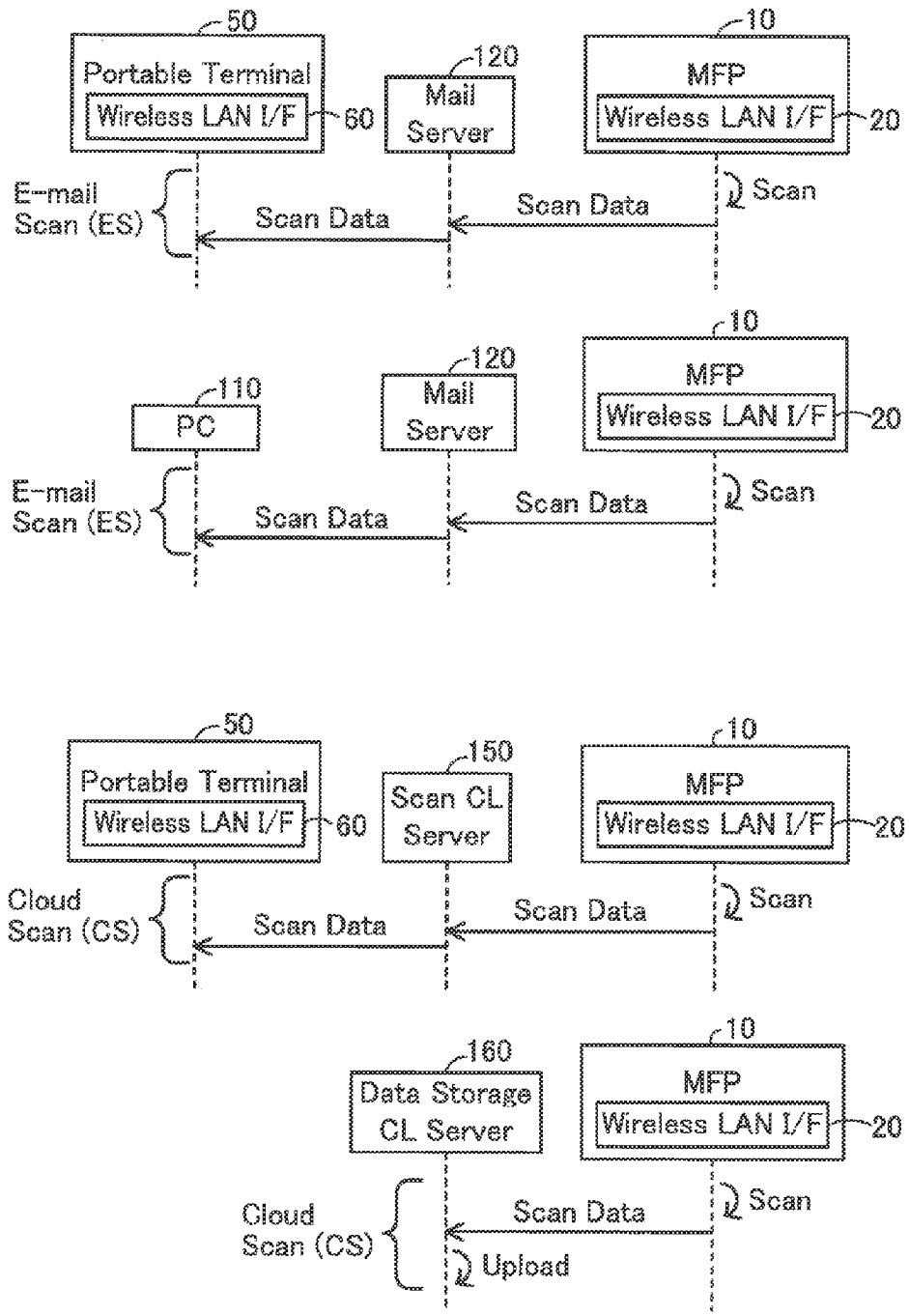
FIG. 3 shows a view for describing a scan function which the MFP is capable of executing.

(Scan Function which MFP 10 is Capable of Executing; FIGS. 2, 3)

Scan functions which the MFP 10 is capable of executing will be described with reference to FIG. 2 and FIG. 3. The scan functions are classified into direct scan (called "DS" below), E-mail scan (called "ES" below), and cloud scan (called "CS" below).

(DS)

In DS, the sending of scan data from the MFP 10 to the portable terminal 50 can be executed not via the Internet. DS is classified into normal Wi-Fi scan, WFD scan, and BT scan.

(Normal Wi-Fi Scan)

In normal Wi-Fi scan, the communication of scan data is executed by using a normal Wi-Fi NW formed in accordance with a normal Wi-Fi scheme. The normal Wi-Fi scheme is a wireless communication scheme defined by Wi-Fi Alliance, and is a wireless communication scheme for executing a wireless communication via the AP 100.

FIG. 2 shows a normal Wi-Fi NW that includes the MFP 10, the portable terminal 50, and the AP 100. In a state where this type of normal Wi-Fi NW has been formed, the wireless LAN I/F 20 of the MFP 10 can send scan data to the wireless LAN I/F 60 of the portable terminal 50, via the AP 100, by using the normal Wi-Fi NW.

The MFP 10 and the portable terminal 50 each store WSI for belonging to the normal Wi-Fi NW (i.e., WSI for executing a normal Wi-Fi communication (called "normal Wi-Fi WSI" below)). The normal Wi-Fi WSI includes an SSID, BSSID, authentication scheme, encryption scheme, password, etc. The SSID is identification information for identifying the normal Wi-Fi NW, and is generated by the AP 100. The BSSID is identification information for identifying the AP 100 (i.e., a MAC address of the AP 100). The normal Wi-Fi WSI of the MFP 10 further includes an IP address of the MFP 10, and the normal Wi-Fi WSI of the portable terminal 50 further includes an IP address of the portable terminal 50. Moreover, in normal Wi-Fi scan, the MFP 10 and wireless LAN I/F 60 of the portable terminal 50 execute the communication of scan data by using, e.g., a communication protocol such as FTP (abbreviation of File Transfer Protocol).

(WFD Scan)

In WFD scan, the communication of scan data is executed by using a WFD NW formed in accordance with a WFD scheme. The WFD scheme is a wireless communication scheme described in the standard document "Wi-Fi Peer-to-Peer (P2P) Technical Specification Version 1.1", created by Wi-Fi Alliance.

Below, an apparatus capable of executing an operation in accordance with the WFD scheme, such as the MFP 10, the portable terminal 50, etc. is called a "WFD-compatible device". In the WFD standard document, three states are defined as the states of the WFD-compatible device: Group Owner state (called "G/O state" below), client state (called "CL state" below), and device state. The WFD-compatible device is capable of selectively operating in one state among the three states.

When a pair of WFD-compatible devices that are in the device state are to newly form a wireless network, the pair of WFD-compatible devices usually execute a wireless communication called G/O negotiation. In the G/O negotiation, it is determined that one of the pair of WFD-compatible devices will assume the G/O state (i.e., become a G/O device), and that the other of the pair of WFD-compatible devices will assume the CL state (i.e., become a CL device). Then the pair of WFD-compatible devices establishes a connection and forms the wireless network.

Below, a wireless network formed in accordance with a procedure (e.g., G/O negotiation) of the WFD scheme is called a "WFD NW". At a stage where the WFD NW has been newly formed by means of G/O negotiation, only one G/O device and one CL device belong to the WFD NW. However, the G/O device can establish a connection with another device, and cause the other device to newly participate in the WFD NW as a CL device. In this case, a state is formed in which two or more CL devices belong to the WFD NW. That is, one G/O device and one or more CL devices can be present in the WFD NW. The O/O device manages the one or more CL devices. Specifically, the G/O device registers the MAC address of each of the one or more CL devices in a management list in the memory of the G/O device. The G/O device is capable of executing, not via another device, a wireless communication of target data with the CL device registered in the management list. Further, the G/O device is capable of relaying a wireless communication of target data (e.g., print data, scan data, etc.) between the plurality of CL devices. In other words, the pair of CL devices are capable of executing a wireless communication of the target data via the G/O device.

FIG. 2 shows an example of the WFD NW in which the PC 110 is a G/O device, and the portable terminal 50 and the MFP 10 are CL devices. In a state where this type of WFD NW has been formed, the wireless LAN I/F 20 of the MFP 10, which is a CL device, can use the WFD NW to send scan data via the PC 110, which is a G/O device, to the wireless LAN I/F 60 of the portable terminal 50, which is a CL device.

FIG. 2 further shows an example of a WFD NW in which the MFP 10 is a G/O device and the portable terminal 50 is a CL device. In a state where this type of WFD NW has been formed, the wireless LAN I/F 20 of the MFP 10, which is a G/O device, can use the WFD NW to send scan data not via another device to the wireless LAN I/F 60 of the portable terminal 50, which is a CL device.

The MFP 10 and the portable terminal 50 each store WSI for belonging to the WFD NW (i.e., WSI for executing WFD communication (called "WFD WSI" below)). The WFD WSI includes an SSID, BSSID, authentication scheme, encryption scheme, password, etc. The SSID is identification information for identifying the WFD NW, and is generated by the G/O device. The BSSID is identification information for identifying the G/O device (i.e., a MAC address of the G/O device). The WFD WSI of the MFP 10 further includes the IP address of the MFP 10, and the WFD WSI of the portable terminal 50 further includes the IP address of the portable terminal 50. Moreover, in WFD scan, the MFP 10 and the portable terminal 50 execute the communication of scan data by using a communication protocol such as FTP.

(BT Scan)

In BT scan, the communication of scan data is executed by using a BT NW formed in accordance with the BT scheme. FIG. 2 shows a BT NW that includes the MFP 10 and the portable terminal 50. In a state where this type of the BT NW has been formed, the BT I/F 24 of the MFP 10 can use the BT NW to send scan data to the BT I/F 64 of the portable terminal 50, not via another device.

The MFP 10 and the portable terminal 50 each store WSI for belonging to the BT NW (i.e., WSI for executing BT communication (called "BT WSI" below)). The BT WSI includes a PIN code (i.e., a pairing code). Moreover, in the BT scan, the MFP 10 and the portable terminal 50 execute a communication of scan data by using a communication protocol such as, e.g., BPP (abbreviation of Basic Printing Profile), BIP (abbreviation of Basic Imaging Profile), OPP (abbreviation of Object Push Profile), etc.

(ES)

In ES, the sending of scan data (i.e., an E-mail communication) from the MFP 10 to another device (e.g., the portable terminal 50, the PC 110) is executed via the internet. As shown in FIG. 3, the wireless LAN I/F 20 of the MFP 10 can send scan data to the wireless LAN I/F 60 of the portable terminal 50 via the mail server 120. In order to execute this type of ES, the MFP 10 stores at least the sending ESI for sending E-mail (i.e., SMTP setting information) in the memory 74. Further, the portable terminal 50 stores at least receiving ESI for receiving E-mail (i.e., POP setting information) in the memory 34. Further, as shown in FIG. 10, the wireless LAN I/F 20 of the MFP 10 can also send scan data to the PC 110 via the mail server 120.

The SMTP setting information includes a URL (abbreviation of Uniform Resource Locator) of an SMTP server, user name, password, etc. The POP setting information includes a URL of a POP server, user name, password, etc. In the present embodiment, the SMTP server and the POP server are shown as the one mail server 120 but, in a variant, may be configured separately. In ES, the MFP 10 and the portable terminal 50 execute communication of scan data by using the SMTP and POP communication protocols.

(CS)

In CS, the sending of scan data (i.e., cloud communication) from the MFP 10 to the portable terminal 50 is executed via the Internet. As shown in FIG. 3, the wireless LAN I/F 20 of the MFP 10 can send scan data to the wireless LAN I/F 60 of the portable terminal 50 via the scan CL server 150. In order to execute this type of cloud communication, the MFP 10 and the portable terminal 50 each store scanning CSI for communicating with the scan CL server 150. The scanning CSI includes a URL of the scan CL server 150, account information, authentication information (e.g., an access token), etc.

As shown in FIG. 3, the MFP 10 can further send scan data to the data storage CL server 160. According to this, the MFP 10 can upload the scan data to the data storage CL server 160. In order to execute this type of cloud communication, the MFP 10 stores the scanning CSI for communicating with the data storage CL server 160. The scanning CSI includes a URL of the data storage CL server 160, account information, authentication information, etc. In CS, the MFP 10 and the portable terminal 50 execute the communication of scan data by using, e.g., an HTTP (abbreviation of Hyper Text Transfer Protocol) communication protocol.

Above DS, ES, CS are each scan functions which the MFP 10 is capable of executing but, in other words, mean communication schemes for the MFP 10 to send scan data. That is, DS means a communication scheme which is a direct scheme (i.e., the normal Wi-Fi scheme, the WFD scheme, and the BT scheme). ES, CS mean communication schemes which are an E-mail scheme and a cloud scheme, respectively. That is, the MFP 10 can send scan data by using any of three communication schemes, namely direct scheme, E-mail scheme, and cloud scheme.

Figure 4:
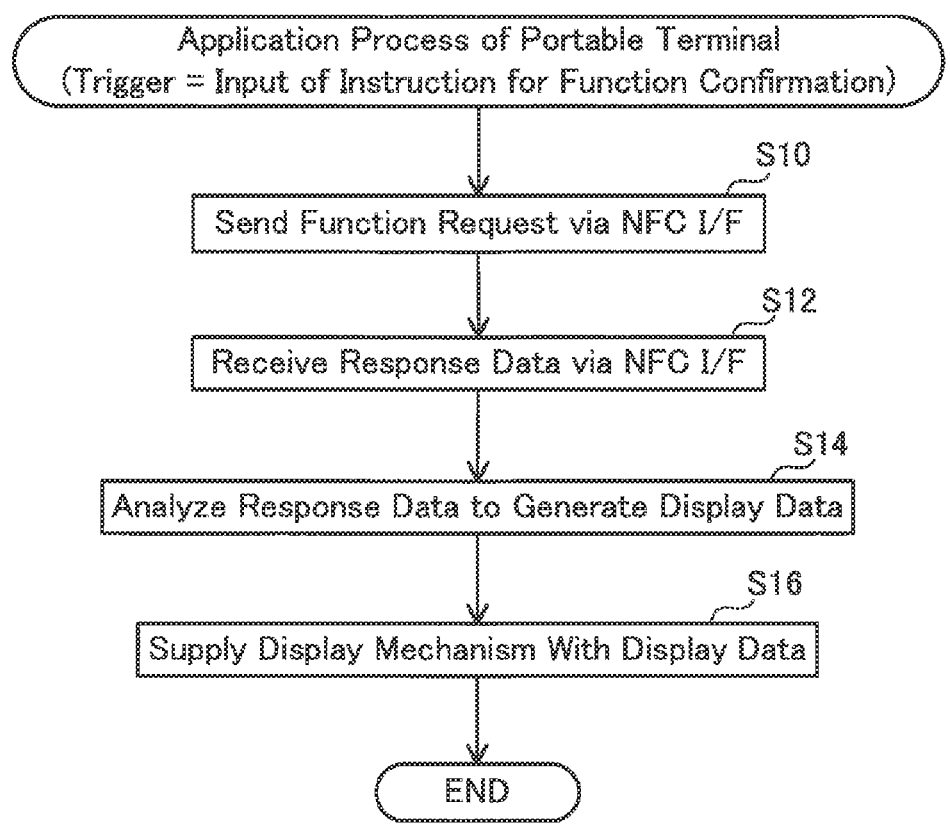
FIG. 4 shows a flowchart of an application process of a portable terminal of a first embodiment.

(Application Process of Portable Terminal 50; FIG. 4)

Next, the contents of a process realized by the MFP application installed on the portable terminal 50 will be described with reference to FIG. 4. In case of wanting to confirm which of the scan functions DS, ES, and CS the MFP 10 is capable of executing, the user of the portable terminal 50 operates the operating key 52, activating the MFP application. Next, by operating the operating key 52, the user gives an instruction to the portable terminal 50 to confirm the scan function. Next, in order to establish an NFC connection between the MFP 10 and the portable terminal 50, the user brings the portable terminal 50 closer to the MFP 10.

When the distance between the portable terminal 50 and the MFP 10 becomes less than a distance (e.g., 10 cm) across which NFC communication can be executed, an NFC connection is established between the MFP 10 and the portable terminal 50. In this case, in S10, the CPU 72 sends a function request to the MFP 10 via the NFC I/F 62 by using the above NFC connection. The function request is a request to cause response data (to be described) to be sent to the MFP 10 (see S70, S72 of FIG. 5).

In S12, the CPU 72 receives the response data from the MFP 10 via the NFC I/F 62 by using the above NFC connection. In a case where the MFP 10 is capable of executing DS, the response data includes information indicating DS OK, and in a case where the MFP is not capable of executing DS, the response data includes information indicating DS NG. In a case where the MFP 10 is capable of executing ES, the response data includes information indicating ES OK, and in a case where the MFP is not capable of executing ES, the response data includes information indicating ES NG. In a case where the MFP 10 is capable of executing CS, the response data includes information indicating CS OK and in a case where the MFP is not capable of executing CS, the response data includes information indicating CS NG.

In S14, the CPU 72 analyzes the response data, and specifies OK or NG for each of DS, ES, and CS. The MFP application includes template data for generating display data. The template data has a data format which can be interpreted by the display mechanism 54. In a case where DS OK is specified, the CPU 72 writes characters indicating "direct scan" in the template data and, in a case where DS NG is specified, does not write the characters indicating "direct scan" in the template data. Similarly, in a case where ES OK (or CS OK) is specified, the CPU 72 writes characters indicating "E-mail scan (or cloud scan)" in the template data and, in a case where ES NO (or CS NG) is specified, does not write the characters indicating "E-mail scan (or cloud scan)" in the template data. When the aforementioned characters have been written in the template data, the display data is completed.

Next, in S16, the CPU 72 supplies the display data to the display mechanism 54. Consequently, the display mechanism 54 displays an image represented by the display data. The image includes characters indicating the scan function which the MFP 10 is capable of executing (e.g., "direct scan"), and does not include characters indicating the scan function which the MFP 10 is not capable of executing (e.g., "E-mail scan"). That is, the scan functions which the MFP 10 is capable of executing are displayed by the display mechanism 54 in a state distinct from the scan functions which the MFP 10 is not capable of executing. In other words, a communication scheme which the MFP 10 is capable of using to send scan data is displayed by the display mechanism 54 in a state distinct from a communication scheme which the MFP 10 is not capable of using to send scan data. By looking at the image displayed by the display mechanism 54, the user can learn the scan function which the MFP 10 is capable of executing, i.e., the communication scheme which the MFP 10 is capable of using to send scan data.

Figure 5:
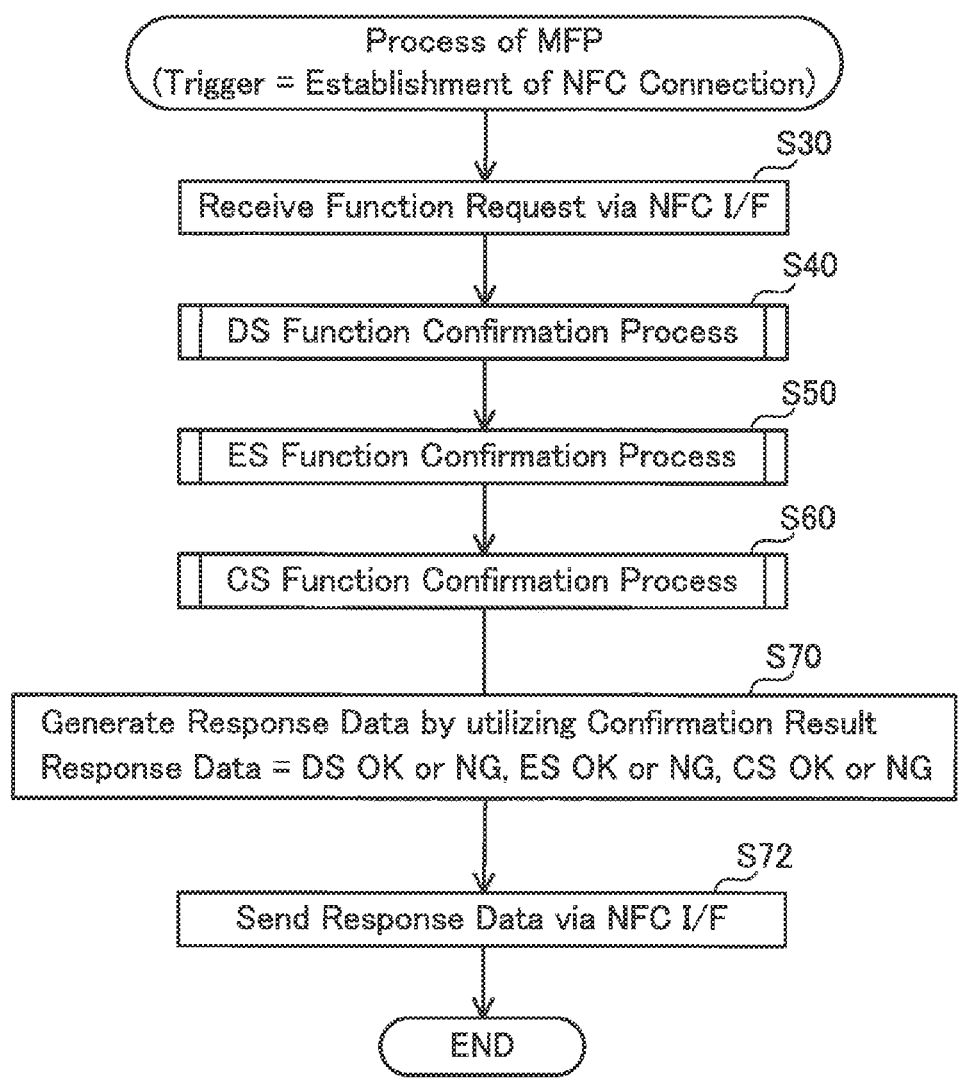
FIG. 5 shows a flowchart of a process of the MFP of the first embodiment.

(Process of MFP 10; FIG. 5)

Next, contents of a process executed by the MFP 10 will be described with reference to FIG. 5. A process of FIG. 5 is started with establishment of an NFC connection between the MFP 10 and the portable terminal 50 as a trigger.

In S30, the CPU 32 receives a function request from the portable terminal 50 via the NFC I/F 22 (see S10 of FIG. 4). Next, in S40, S50, S60, the CPU 32 executes a DS function confirmation process (see FIG. 6), an ES function confirmation process (see FIG. 7), and a CS function confirmation process (see FIG. 8). In these processes, the CPU 32 specifies the scan function, among DS, ES, and CS, which the MFP 10 is capable of executing. These processes will be described in detail later.

Next, in S70, the CPU 32 generates response data by using a confirmation result of S40 to S60. As will be described in detail later, in S40, information indicating OK or NG is stored in the memory 34 for each of normal Wi-Fi scan, WFD scan, and BT scan. In S70, in a case where information indicating OK is being stored in the memory 34 for at least one of normal Wi-Fi scan, WFD scan, and BT scan, the CPU 32 generates response data which includes information indicating DS OK. Further, in a case where information indicating NG for all of normal Wi-Fi scan, WFD scan, and BT scan is being stored in the memory 34, the CPU 32 generates response data which includes information indicating DS NG.

Further, as will be described in detail later, in S50, information indicating ES OK or ES NG is stored in the memory 34, and in S60, information indicating CS OK or CS NG is stored in the memory 34. In S70, in a case where information indicating ES OK (or CS OK) is being stored in the memory 34, the CPU 32 generates response data which includes information indicating ES OK (or CS OK) and, in a case where information indicating ES NG (or CS NO) is being stored in the memory 34, the CPU 32 generates response data which includes information indicating ES NO (or CS NG).

In S72, the CPU 32 sends the response data to the portable terminal 50 via the NFC I/F 22. According to this, by using the response data, the portable terminal 50 can cause the display mechanism 54 to display an image indicating the scan function which the MFP 10 is capable of using (see S12 to S16 of FIG. 4). Moreover, the NFC connection used in the process of S72 is the NFC connection which became the starting of the process of S30 as the trigger.

Figure 6:
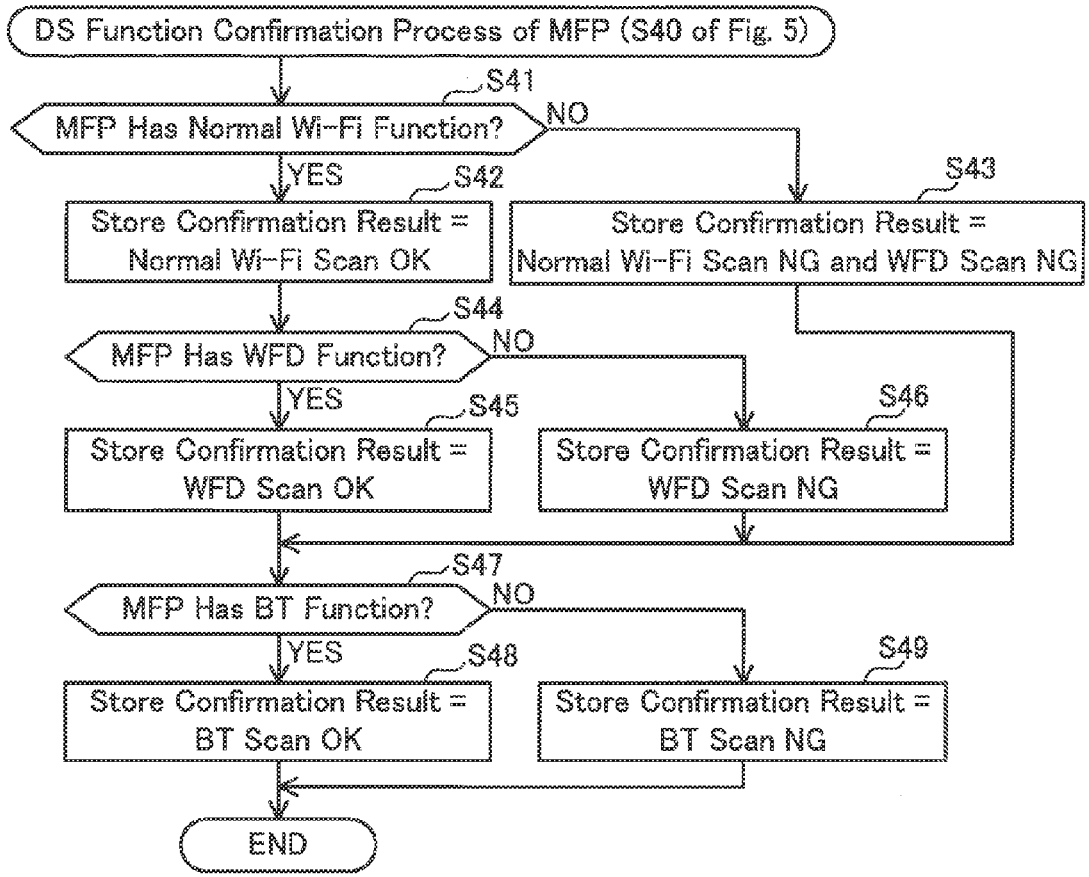
FIG. 6 shows a flowchart of a DS function confirmation process.

(DS Function Confirmation Process; FIG. 6)

The DS function confirmation process of S40 of FIG. 5 will be described with reference to FIG. 6. In S41, the CPU 32 determines whether the MFP 10 has the normal Wi-Fi function (i.e., whether the MFP 10 is comprising the wireless LAN I/F 20). In a case where the MFP 10 has the normal Wi-Fi function, the CPU 32 determines YES in S41 and, in S42, stores information indicating normal Wi-Fi scan OK in the memory 34. Upon ending S42, processing proceeds to S44.

On the other hand, in a case where the MFP 10 does not have the normal Wi-Fi function, the CPU 32 determines NO in S41 and, in S43, stores information indicating normal Wi-Fi scan NG, and information indicating WFD scan NG in the memory 34. Wireless communication of the WFD scheme is a wireless communication having wireless communication of the normal Wi-Fi scheme as a prerequisite. Consequently, in the case where the MFP 10 does not have the normal Wi-Fi function (the case of NO in S41), the MFP 10 does not have the WFD function either (i.e., a program for executing a WFD communication is not being stored in the memory 34). Consequently, in S43, not only information indicating normal Wi-Fi scan NO, but also information indicating WFD scan NG is stored in the memory 34. Upon ending S43, processing proceeds to S47.

In S44, the CPU 32 determines whether the MFP 10 has the WFD function (i.e., whether a program for executing WFD communication is being stored in the memory 34). In a case where the MFP 10 has the WFD function, the CPU 32 determines YES in S44 and, in S45, stores information indicating WFD scan OK in the memory 34. On the other hand, in a case where the MFP 10 does not have the WFD function, the CPU 32 determines NO in S44 and, in S46, stores information indicating WFD scan NG in the memory 34. Upon ending S45 or S46, processing proceeds to S47.

In S47, the CPU 32 determines whether the MFP 10 has the BT function (i.e., whether the MFP 10 is comprising the BT I/F 24). In a case where the MFP 10 has the BT function, the CPU 32 determines YES in S47 and, in S48, stores information indicating BT scan OK in the memory 34. On the other hand, in a case where the MFP 10 does not have the BT function, the CPU 32 determines NO in S47 and, in S49, stores information indicating BT scan NG in the memory 34.

Figure 7:
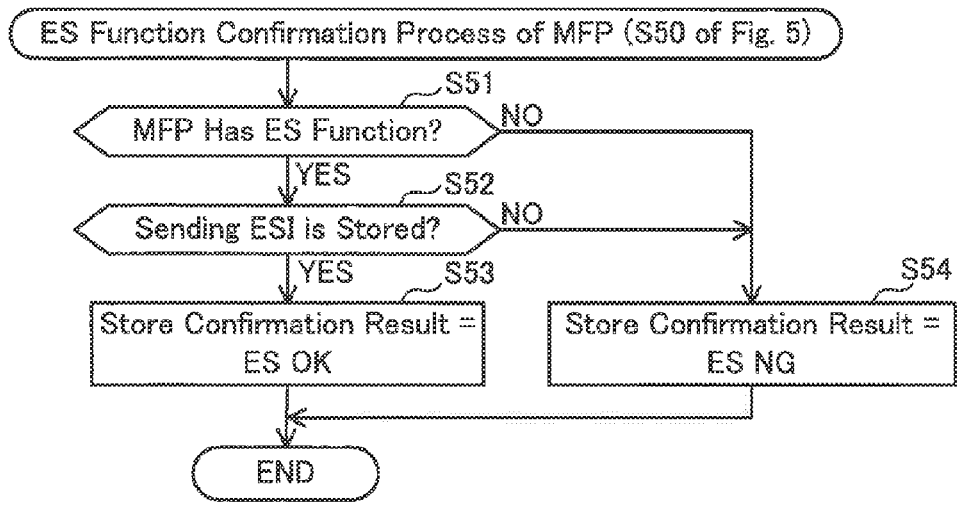
FIG. 7 shows a flowchart of an ES function confirmation process.

(ES Function Confirmation Process; FIG. 7)

The ES function confirmation process of S50 of FIG. 5 will be described with reference to FIG. 7. In S51, the CPU 32 determines whether the MFP 10 has the ES function (i.e., whether a program for sending an E-mail that includes scan data is being stored in the memory 34). In a case where the MFP 10 has the ES function, the CPU 32 determines YES in S51, and proceeds to S52. On the other hand, in a case where the MFP 10 does not have the ES function, the CPU 32 determines NO in S51 and, in S54, stores information indicating ES NG in the memory 34.

In S52, the CPU 32 determines whether the sending ESI (i.e., the SMTP setting information), which is the ESI for the MFP 10 to send E-mail, is being stored in the memory 34. In a case where the sending ESI is being stored in the memory 34, the CPU 32 determines YES in S52 and, in S53, stores information indicating ES OK in the memory 34. On the other hand, in a case where the sending ESI is not being stored in the memory 34, the CPU 32 determines NO in S52 and, in S54, stores information indicating ES NG in the memory 34.

Figure 8:
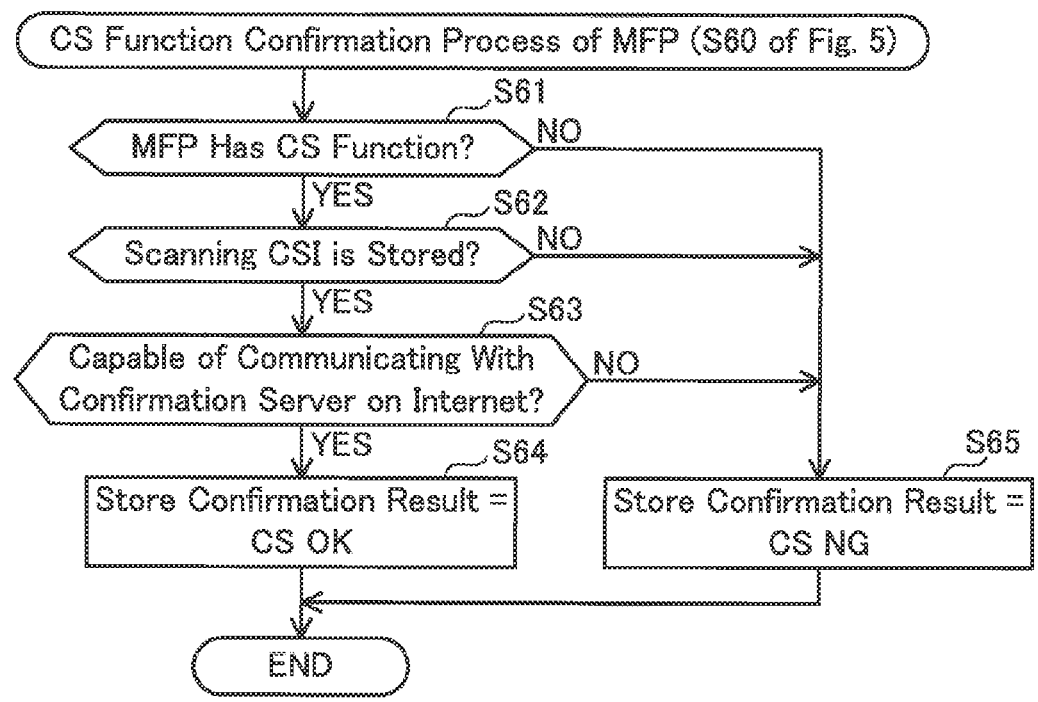
FIG. 8 shows a flowchart of a CS function confirmation process.

(CS Function Confirmation Process; FIG. 8)

The CS function confirmation process of S60 of FIG. 5 will be described with reference to FIG. 8. In S61, the CPU 32 determines whether the MFP 10 has the CS function (i.e., whether the scan CL server 150 and a program for executing cloud communication with data storage CL sever 160 are being stored in the memory 34). In a case where the MFP 10 has the CS function, the CPU 32 determines YES in S61, and proceeds to S62. On the other hand, in a case where the MFP 10 does not have the CS function, the CPU 32 determines NO in S61 and, in S65, stores information indicating CS NG in the memory 34.

In S62, the CPU 32 determines whether the scanning CSI (i.e., a URL of the server 150 or the server 160, account information, authentication information, etc.), which is the CSI for the MFP 10 to use the scan CL server 150 or data storage CL server 160, is being stored in the memory 34. In a case where the scanning CSI is being stored in the memory 34, the CPU 32 determines YES in S62, and proceeds to S63. On the other hand, in a case where the scanning CSI is not being stored in the memory 34, the CPU 32 determines NO in S62 and, in S65, stores information indicating CS NG in the memory 34.

In S63, the CPU 32 determines whether the MFP 10 is capable of communicating with the confirmation server 130 on the Internet. Specifically, the CPU 32 sends a signal with a URL of the confirmation server 130 stored in advance in the memory 34 as a destination, and monitors whether a response signal is received from the confirmation server 130. In a case where the response signal is received from the confirmation server 130, the CPU 32 determines YES in S63 and, in S64, stores information indicating CS OK in the memory 34. On the other hand, in a case where a response signal is not received from the confirmation server 130, the CPU 32 determines NO in S63 and, in S65, stores information indicating CS NG in the memory 34. Moreover, NO may be determined in S63, e.g., in a case where a contract for Internet communication has not been made with a provider, in a case where a gateway for Internet communication is not functioning, etc.

(Specific Cases; FIG. 9)

Specific cases of the present embodiment will be described with reference to FIG. 9. Moreover, in FIG. 9, reference numbers different from the MFP 10 of FIG. 1 have been assigned, such as MFP 10A, 10B. If there are differences between the MFP of these cases (the MFP 10A, etc.) and the MFP 10 of FIG. 1, these differences will be described before the contents of each case are described.

(Case A; FIG. 9)

In case A, the MFP 10A is capable of executing all of normal Wi-Fi scan, WFD scan, BT scan, ES, and CS. After giving an instruction for confirmation of the scan function to the portable terminal 50, the user of the portable terminal 50 brings the portable terminal 50 closer to the MFP 10A. Consequently, an NFC connection between the portable terminal 50 and the MFP 10A is established. The portable terminal 50 sends a function request to the MFP 10A by using the NFC connection (S10 of FIG. 4).

Upon receiving the function request from the portable terminal 50 (S30 of FIG. 5), the MFP 10A executes the confirmation processes (S40, S50, S60 of FIG. 5), and then generates response data that includes information indicating DS OK, information indicating ES OK, and information indicating CS OK (S70 of FIG. 5). The MFP 10A sends the response data to the portable terminal 50 by using the NFC connection (S72 of FIG. 5).

The portable terminal 50 receives the response data from the MFP 10A by using the NFC connection. At this juncture, the portable terminal 50 outputs an alarm sound indicating that the NFC communication has ended. According to this, the user can learn that the portable terminal 50 may be taken away from the MFP 10A, and the portable terminal 50 is taken away from the MFP 10A. Consequently, the NFC connection is disconnected.

The portable terminal 50 analyzes the response data, and generates display data (S14 of FIG. 4). Then, the portable terminal 50 causes the display mechanism 54 to display an image represented by the display data (S16 of FIG. 4). In the present case, an image is displayed that includes the characters indicating "direct scan", the characters indicating "E-mail scan", and the characters indicating "cloud scan". According to this, the user can learn that the MFP 10A is capable of executing all the scan functions DS, ES, and CS. That is, the user can learn that the MFP 10A is capable of using all the communication schemes to send scan data, i.e., direct scheme, E-mail scheme, and cloud scheme. According to this, in case of wanting to cause the MFP 10A to execute scanning by using e.g., the portable terminal 50, the PC 110, etc., the user can appropriately select a communication scheme that the MFP 10A is capable of using. Thus, according to the present embodiment, user convenience is increased.

(Case B)

In case B, the MFP 10B is a device different from the MFP 10A, and is capable of executing normal Wi-Fi scan and ES, but is not capable of executing WFD scan, BT scan, and CS. Processes until the MFP 10B receives the function request are the same as case A.

The MFP 10B generates response data which includes information indicating DS OK, information indicating ES OK, and information indicating CS NG (S70 of FIG. 5), and sends the response data to the portable terminal 50 by using the NFC connection (S72 of FIG. 5). Moreover, since the MFP 10B is not capable of executing WFD scan and BT scan, but is capable of executing normal Wi-Fi scan, the response data includes information indicating DS OK.

As in case A, the portable terminal 50 generates display data (S14 of FIG. 4), and causes the display mechanism 54 to display an image (S16 of FIG. 4). In case B, an image is displayed that includes the characters indicating "direct scan", and the characters indicating "E-mail scan". The image does not include the characters indicating "cloud scan".

Since the communication schemes that the MFP 10B of case B is capable of using are different from the communication schemes that the MFP 10A of case A is capable of using, the image displayed in case A and the image displayed in case B are different. Thus, the user can learn, for the plurality of MFPs 10A, 10B, the communication scheme that the MFP is capable of using.

(Corresponding Relationships)

In the case of FIG. 9, the portable terminal 50, the MFP 10A and the MFP 10B are respectively examples of the "terminal apparatus", the "first function executing apparatus", and the "second function executing apparatus". In case A, the three communication schemes DS, ES, and CS are an example of the "plurality of communication schemes" and the "M1 items of communication schemes". In case B, the three communication schemes DS, ES, and CS are an example of the "plurality of communication schemes", and DS and ES are an example of the "M2 items of communication schemes". The image displayed in case A, and the image displayed in case B are respectively examples of the "first image" and the "fourth image".

The response data of case A, and the response data of case B are respectively examples of the "first information" and the "second information". CS, the scanning CSI, and the confirmation server 130 are respectively examples of the "first communication scheme", the "first communication setting information", and the "server". The information included in the response data of case A (i.e., DS OK, ES OK, CS OK) is an example of the "first data". Further, in the case A, if the scanning CSI is not being stored in the MFP 10A (NO in S62 of FIG. 8), the response data indicates DS OK, ES OK, and CS NG. Further, in case A, if the MFP 10A is not capable of communicating with the confirmation server 130 (NO in S63 of FIG. 8), the response data indicates DS OK, ES OK, and CS NG. The information (i.e., DS OK, ES OK, CS NG) included in the response data in these cases is an example of the "second data".

The process of S12 of FIG. 4 is an example of the "receiving first information". The processes of S14 and S16 are an example of the "causing a display mechanism of the terminal apparatus to display a first image". The processes of S40, S50, and S60 of FIG. 5 are an example of the "specifying. The processes of S70 and S72 are an example of the "sending first information".

Second Embodiment

Points different from the first embodiment will be described. In the present embodiment, the portable terminal 50 causes the MFP 10 to execute the sending of scan data in accordance with the communication scheme selected by the user after having caused the display of an image indicating a communication scheme that the MFP 10 is capable of using to send scan data.

(Application Process of Portable Terminal 50; FIG. 10)

Contents of a process realized by the MFP application of the present embodiment will be described with reference to FIG. 10. S10 is the same as S10 of FIG. 4.

In S12-2, the CPU 72 receives response data via the NFC I/F 62. The point of the response data including information indicating DS OK or NG, etc. is the same as in the first embodiment. However, in a case where the response data includes information indicating DS OK, the response data further includes network information corresponding to DS.

Specifically, if the MFP 10 is belonging to a normal Wi-Fi NW, the network information corresponding to DS includes, within the normal Wi-Fi WSI of the MFP 10, a set of IDs (i.e., a set of normal Wi-Fi SSID and normal Wi-Fi BSSID) and the normal Wi-Fi IP address of the MFP 10. Moreover, in this case, the network information corresponding to DS does not include the password within the normal Wi-Fi WSI of the MFP 10. This is because a security policy has been adopted in the present embodiment whereby, in the normal Wi-Fi NW, the AP 100 is authorized to cause another device to participate in the normal Wi-Fi NW, but a device (e.g., the MFP 10, the portable terminal 50) different from the AP 100 is not authorized to cause another device to participate in the normal Wi-Fi NW. However, in a variant, the network information corresponding to DS may include a password.

Further, in a case where the MFP 10 is belonging to a WFD NW, the network information corresponding to DS includes, within the WFD WSI of the MFP 10, the set of IDs (i.e., the set of WFD SSID and WFD BSSID) and the WFD IP address of the MFP 10. Moreover, in a case where the MFP 10 is in the G/O state, the network information corresponding to DS further includes the password within the WFD WSI of the MFP 10. However, in a case where the MFP 10 is in the CL state, the network information corresponding to DS does not include the password within the WFD WSI of the MFP 10. This is because a security policy has been adopted in the present embodiment whereby, in the WFD NW, the G/O device is authorized to cause another device to participate in the WFD NW, but a CL device is not authorized to cause another device to participate in the WFD NW. However, in a variant, in a case where the MFP 10 is in the CL state, the network information corresponding to DS may include a password.

Further, in a case where the MFP 10 is belonging to the BT NW, the network information corresponding to DS includes the BT WSI. Moreover, after the process of S12-2 has been executed, a first time of NFC connection between the portable terminal 50 and the MFP 10 is disconnected.

S14, S16 are the same as S14, S16 of FIG. 4. By operating the operating key 52, the user can select one communication scheme from among the one or more communication schemes indicated in the image displayed in S16. In other words, by detecting an operation by the user, the CPU 72 can select one communication scheme from among the one or more communication schemes. In S18, the CPU 72 monitors whether the selection of the communication scheme has been executed. In a case where the selection has been executed, the CPU 72 determines YES in S18, and proceeds to S20.

The user brings the portable terminal 50 closer to the MFP 10 in order to establish a second time of NFC connection between the portable terminal 50 and the MFP 10. In S20, the CPU 72 sends a selection result of the user (i.e., DS, ES, or CS) to the MFP 10 via the NFC I/F 62 by using the second time of NFC connection. Moreover, in a case where the selection result indicates ES, the selection result further includes an E-mail address (i.e., an E-mail address of the scan data destination (e.g., the portable terminal 50, the PC 110)) stored in advance in the memory 74 of the portable terminal 50. Further, in a case where the selection result indicates CS, the selection result further includes a URL (i.e., a URL of the scan data destination (e.g., the scan CL server 150, the data storage CL server 160)) stored in advance in the memory 74 of the portable terminal 50.

In S22, the CPU 72 determines whether the selection result indicates DS. In a case where the selection result indicates DS, the CPU 72 determines YES in S22, and proceeds to S24. On the other hand, in a case where the selection result indicates ES or CS, the CPU 72 determines NO in S22, and proceeds to S26.

In S24, the CPU 72 first determines whether the MFP 10 and the portable terminal 50 are belonging to the same NW. For example, in a case where a set of normal Wi-Fi SSID and normal Wi-Fi BSSID included in the response data of the MFP 10 and a set of normal Wi-Fi SSID and normal Wi-Fi BSSID of the portable terminal 50 within the memory 74 are identical, the CPU 72 determines that the MFP 10 and the portable terminal 50 are belonging to the same normal Wi-Fi NW. Further, e.g., in a case where a set of WFD SSID and WFD BSSID of the MFP 10 included in the response data and a set of WFD SSID and WFD BSSID of the portable terminal 50 within the memory 74 are identical, the CPU 72 determines that the MFP 10 and the portable terminal 50 are belonging to the same WFD NW. Further, e.g., in a case where a PIN code included in the BT WSI of the MFP 10 included in the response data and a PIN code included in the BT WSI of the portable terminal 50 within the memory 74 are identical, the CPU 72 determines that the MFP 10 and the portable terminal 50 are belonging to the same BT NW.

Moreover, in the present embodiment, the CPU 72 determines whether the MFP 10 and the portable terminal 50 are belonging to the same NW (the normal Wi-Fi NW or the WFD NW) by determining whether the sets of SSID and BSSID are identical. However, in a variant, the CPU 72 may determine whether the MFP 10 and the portable terminal 50 are belonging to the same NW by determining only whether the SSIDs are identical, or by determining only whether the BSSIDs are identical.

In a case where the CPU 72 determines that the MFP 10 and the portable terminal 50 are belonging to the same NW, the CPU 72 sends a scan instruction to the MFP 10 by using the same NW. For example, in a case where the same NW is a normal Wi-Fi NW, the CPU 72 sends a scan instruction via the wireless LAN I/F 60, with the normal Wi-Fi IP address of the MFP 10 included in the response data as the destination. According to this, the MFP 10 receives the scan instruction from the portable terminal 50 via the AP 100. The scan instruction includes the IP address of the portable terminal 50 used in the normal Wi-Fi NW. Consequently, the MFP 10 can send scan data to the portable terminal 50 via the AP 100 by sending scan data with the IP address as the destination (see normal Wi-Fi scan of FIG. 2).

Further, e.g., in a case where the aforementioned same NW is a WFD NW, the CPU 72 sends a scan instruction via the wireless LAN I/F 60, with the WFD IP address of the MFP 10 included in the network information as the destination. According to this, the MFP 10 receives the scan instruction from the portable terminal 50 via the PC 110, which is a G/O device, or not via another device. The scan instruction includes the IP address of the portable terminal 50 used in the WFD NW. Consequently, the MFP 10 can send scan data to the portable terminal 50 via the PC 110, which is a G/O device, or not via another device, by sending scan data with the IP address as the destination (see WFD scan of FIG. 2).

Further, e.g., in a case where the aforementioned same NW is a BT NW, the CPU 72 sends a scan instruction via the BT I/F 64 by using the PIN code included in the BT WSI of the MFP 10 (i.e., the BT WSI of the portable terminal 50). According to this, the MFP 10 receives the scan instruction from the portable terminal 50 not via another device. Consequently, the MFP 10 can send scan data to the portable terminal 50 not via another device (see BT scan of FIG. 2).

As described above, in S24, in a case where the MFP 10 and the portable terminal 50 are belonging to the same NW, the portable terminal 50 sends the scan instruction to the MFP 10 by prioritizing the same NW. According to this, the portable terminal 50 can quickly receive the scan data from the MFP 10 without needing to establish a wireless connection with the MFP 10.

Moreover, in a case where the MFP 10 and the portable terminal 50 are belonging to two or more same NWs, the CPU 72 prioritizes the NW having a faster communication speed. For example, in a case where the MFP 10 and the portable terminal 50 are belonging to the same WFD NW and to the same BT NW, the CPU 72 sends the scan instruction to the MFP 10 by using the WFD NW.

Further, in a case where it is determined that the MFP 10 and the portable terminal 50 are not belonging to the same NW, the CPU 72 executes the following process. As described above, the response data does not include the password used in the normal Wi-Fi NW to which the MFP 10 is belonging. Consequently, the CPU 72 cannot cause the portable terminal 50 to participate in the normal Wi-Fi NW.

The response data can include the information (WFD SSID, WFD BSSID, password, and WFD IP address of the MFP 10) used in the WFD NW in which the MFP 10 is the G/O device. In this case, the CPU 72, establishes a wireless connection with the MFP 10, which is a G/O device, by using this information. According to this, the CPU 72 can cause the portable terminal 50 to participate, as a CL device, in the WFD NW in which the MFP 10 is the G/O device. Then, the CPU 72 sends the scan instruction via the wireless LAN I/F 60 with, as the destination, the WFD IP address of the MFP 10 included in the destination information.

Further, the response data can include the BT WSI (i.e., PIN code) of the MFP 10. In this case, the CPU 72 establishes a wireless connection with the MFP 10 by using the BT WSI. Then, the CPU 72 sends the scan instruction via the BT I/F 64 by using the PIN code.

Moreover, in a case where the response data includes both the information used in the WFD NW in which the MFP 10 is the G/O device, and the BT WSI of the MFP 10, the CPU 72 prioritizes use of the WFD NW, which has the higher communication speed, and causes the portable terminal 50 to participate as a CL device in the WFD NW in which the MFP 10 is the G/O device.

As described above, when the scan instruction is sent to the MFP 10 in S24, the MFP 10 sends the scan data to the portable terminal 50. In S28, the CPU 72 receives the scan data from the MFP 10. In a case where the normal Wi-Fi NW or WFD NW is used, the CPU 72 receives the scan data via the wireless LAN I/F 60. In a case where the BT NW is used, the CPU 72 receives the scan data via the BT I/F 64.

On the other hand, in a case where the selection result is ES (NO in S22), the selection result sent in S20 includes the E-mail address of the scan data destination. In a case where the E-mail address of the scan data destination is the E-mail address of the portable terminal 50 itself; in S26 the CPU 72 receives the scan data from the MFP 10 via the E-mail server 120 (see the upper figure of ES of FIG. 3). In this case, the CPU 72 may receive the scan data via the wireless LAN I/F 60, or may receive the scan data via another I/F (e.g., a wired LAN I/F, an I/F for a cellular network). Moreover, in a case where the E-mail address of the scan data destination is a device different from the portable terminal 50 (e.g., E-mail address of the PC 110), in S26 the CPU 72 does not receive scan data from the MFP 10 (see the lower figure of ES of FIG. 3).

Further, in a case where the selection result is CS (NO in S22), the selection result sent in S20 includes the URL of the scan data destination. In a case where the URL of the scan data destination is the URL of the scan CL server 150, in S26 the CPU 72 receives the scan data from the MFP 10 via the scan CL server 150 (see the upper figure of CS of FIG. 3). In this case, the CPU 72 may receive the scan data via the wireless LAN I/F 60, or may receive the scan data via another I/F. Moreover, in a case where the URL of the scan data destination is the URL of the data storage CL server 160, in S26 the CPU 72 does not receive scan data from the MFP 10 (see the lower figure of CS of FIG. 3).

(Process of MFP 10; FIG. 11)

Contents of a process executed by the MFP 10 will be described with reference to FIG. 11. S30 to S60 are the same as S30 to 60 of FIG. 5. In S70-2, when the CPU 32 is to generate response data which includes information indicating DS OK, the CPU 32 further generates response data which includes network information corresponding to DS.

Specifically, in a case where the MFP 10 is belonging to a normal Wi-Fi NW, the CPU 32 generates response data which includes, within the normal Wi-Fi WSI of the MFP 10 within the memory 34, the set of IDs (i.e., the set of normal Wi-Fi SSID and normal Wi-Fi BSSID), and the normal Wi-Fi IP address of the MFP 10.

Further, in a case where the MFP 10 is belonging to a WFD NW as a G/O device, the CPU 32 generates response data which includes, within the WFD WSI of the MFP 10 within the memory 34, the set of IDs (i.e., the set of WFD SSID and WFD BSSID), the password, and the WFD IP address of the MFP 10. Further, in a case where the MFP 10 is belonging to a WFD NW as a CL device, the CPU 32 generates response data which includes, within the WFD WSI of the MFP 10 within the memory 34, the set of IDs (i.e., the set of WFD SSID and WFD BSSID), and the WFD IP address of the MFP 10.

Further, in a case where the MFP 10 is in the device state, i.e., in a case where the MFP 10 is not belonging to a WFD NW, the CPU 32 spontaneously moves the state of the MFP 10 from the device state to the G/O state without executing G/O negotiation. The CPU 32 further generates WFD WSI, and stores the WFD WSI in the memory 34. According to this, the CPU 32 can newly form a WFD NW to which only the MFP 10, which is a G/O device, belongs. Thereupon, the CPU 32 generates response data which includes, within the WFD WSI of the MFP 10 within the memory 34, the set of IDs (i.e., the set of WFD SSID and WFD BSSID), the password, and the WFD IP address of the MFP 10.

Further, in a case where the MFP 10 is belonging to a BT NW, the CPU 32 generates response data which includes BT WSI within the memory 34. Moreover, in a case where the MFP 10 is not belonging to a BT NW, the CPU 32 generates BT WSI, and stores the BT WSI in the memory 34. According to this, the CPU 32 can newly form a BT NW to which only the MFP 10 belongs. Thereupon, the CPU 32 generates response data which includes the BT WSI of the MFP 10 within the memory 34.

In S72, the CPU 32 sends the response data to the portable terminal 50 via the NFC I/F 22. Next, in S74, the CPU 32 receives the selection result from the portable terminal 50 via the NFC I/F 22 by using the second time of NFC connection. Next, in S76, the CPU 32 determines whether the selection result indicates DS. In a case where the selection result indicates DS, the CPU 32 determines YES in S76, and in S78 receives the scan instruction from the portable terminal 50. As described above, the scan instruction is sent from the portable terminal 50 to the MFP 10 by using the normal Wi-Fi NW, the WFD NW, or the BT NW (S24 of FIG. 10). Consequently, the CPU 32 receives the scan instruction via the wireless LAN I/F 20 or the BT I/F 24.

In S80, the CPU 32 causes the scan mechanism 18 to execute a scan of a document. According to this, the scan mechanism 18 generates scan data.

In S82, the CPU 32 sends the scan data in accordance with the communication scheme indicated by the selection result. For example, in a case where the selection result is DS, in S78 the CPU 32 receives the scan instruction from the portable terminal 50. For example, in case of receiving the scan instruction from the portable terminal 50 by using the normal Wi-Fi NW or the WFD NW, the CPU 32 sends the scan data via the wireless LAN I/F 20 with, as the destination, the IP address of the portable terminal 50 included in the scan instruction. According to this, the MFP 10 can send the scan data to the portable terminal 50 by using the normal Wi-Fi NW or the WFD NW. Further, e.g., in case of receiving the scan instruction from the portable terminal 50 by using the BT NW, the CPU 32 sends the scan data via the BT I/F 24. According to this, the MFP 10 can send the scan data to the portable terminal 50 by using the BT NW.

Further, e.g., in a case where the selection result is ES, the CPU 32 sends scan data, with the E-mail address included in the selection result as the destination. In this case, the CPU 32 may send the scan data via the wireless LAN I/F 20, or may send the scan data via another I/F (e.g., a wired LAN I/F). For example, in a case where the E-mail address included in the selection result is the E-mail address of the portable terminal 50, the MFP 10 can send the scan data to the portable terminal 50. Further, e.g., in a case where the E-mail address included in the selection result is the E-mail address of the PC 110, the MFP 10 can send the scan data to the PC 110.

Further, e.g., in a case where the selection result is CS, the CPU 32 sends scan data, with the URL included in the selection result as the destination. In this case, the CPU 32 may send the scan data via the wireless LAN I/F 20, or may send the scan data via another I/F (e.g., a wired LAN I/F). For example, in a case where the URL included in the selection result is the URL of the scan CL server 150, the MFP 10 can send the scan data to the portable terminal 50 via the scan CL server 150. Further, e.g., in a case where the URL included in the selection result is the URL of the data storage CL server 160, the MFP 10 can send the scan data to the data storage CL server 160, and upload the scan data to the data storage CL server 160.

(Case C; FIG. 12)

A specific case realized by the processes of FIG. 10 and FIG. 11 will be described with reference to FIG. 12 and FIG. 13. In case C, an MFP 10C is capable of executing normal Wi-Fi scan, WFD scan, BT scan, and, ES, but is not capable of executing CS. The MFP 10C and the portable terminal 50 belong to a normal Wi-Fi NW formed by the AP 100. In the normal Wi-Fi NW, "X1" is used as the SSID, and "Y1" is used as the BSSID.

In the present case, the response data sent to the portable terminal 50 from the MFP 10C includes not only information indicating DS OK, information indicating ES OK, and information indicating CS NO, but also the network information corresponding to DS (i.e., "X1, Y1, and IP1 (normal Wi-Fi IP address of the MFP 10C)" and "BT WSI").

Then, in a case where "direct scan" is selected by the user (YES in S22 of FIG. 10), the portable terminal 50 determines that the set of "X1" and "Y1" of the normal Wi-Fi WSI of the MFP 10C included in the response data, and the set of "X1" and "Y1" of the normal Wi-Fi WSI of the portable terminal 50, are identical (i.e., determines that the MFP 10C and the portable terminal 50 belong to the same normal Wi-Fi NW; S24 of FIG. 10). Consequently, the portable terminal 50 prioritizes the normal Wi-Fi NW to send the scan instruction with, as the destination, the normal Wi-Fi IP address "IP1" of the MFP 10C included in the response data (S24 of FIG. 10). According to this, the portable terminal 50 can send the scan instruction to the MFP 10C via the AP 100.

Upon receiving the scan instruction from the portable terminal 50, the MFP 10C executes a scan process (S80 of FIG. 11), and sends scan data, with the IP address of the portable terminal 50 included in the scan instruction as the destination (S82 of FIG. 11). According to this, the MFP 10C can send the scan data to the portable terminal 50 by using the normal Wi-Fi NW.

(Case C1)

Moreover, "direct scan" is selected by the user in case C. However, if "E-mail scan" is selected by the user in case C, the portable terminal 50 sends a selection result indicating ES to the MFP 10C by using the NFC communication (S20 of FIG. 10). In this case, the selection result includes, e.g., the E-mail address of the portable terminal 50 (S20 of FIG. 10). Consequently, the MFP 10C sends an E-mail which includes the scan data to the portable terminal 50, with the E-mail address of the portable terminal 50 as the destination (S82 of FIG. 11).

(Case C2)

In case C1, the selection result may include, e.g., the E-mail address of the PC 110 (S20 of FIG. 10). In this case, the MFP 10C sends an E-mail which includes scan data to the PC 110, with the E-mail address of the PC 110 as the destination (S82 of FIG. 11).

(Case D; FIG. 13)

In case D, an MFP 10D is capable of executing normal Wi-Fi scan, WFD scan, BT scan, and CS, but is not capable of executing ES. The MFP 10D is belonging to a normal Wi-Fi NW (SSID="X1", BSSID="Y1") formed by the AP 100. However, the portable terminal 50 is not belonging to the normal Wi-Fi NW.

In the present case, the response data sent to the portable terminal 50 from the MFP 10D includes not only information indicating DS OK, information indicating ES OK, and information indicating CS NG, but also the network information corresponding to DS (i.e., "X1, Y1, IP1", "X2, Y2, IP2", "BT WSI"). At the time the MFP 10D receives a function request from the portable terminal 50, the MFP 10D is not belonging to the WFD NW (i.e., the state of the MFP 10D is the device state). Consequently, the MFP 10D moves from the device state to the G/O state, newly forms a WFD NW, and generates WFD WSI. "X2", "Y2", "IP2" are respectively the SSID, BSSID, and WFD IP address of the MFP 10 within this WFD WSI.

Then, in a case where "direct scan" is selected by the user (YES in S22 of FIG. 10), the portable terminal 50 determines that the MFP 10D and the portable terminal 50 are not belonging to the same network (S24 of FIG. 10). Thereupon, the portable terminal 50 prioritizes use of the network information of the WFD NW, which has the higher communication speed among the network information of the WFD NW and the BT NW included in the response data, to send a connection request to the MFP 10D for causing the portable terminal 50 to participate in the WFD NW (S24 of FIG. 10). According to this, a wireless connection between the MFP 10D and the portable terminal 50 is established, and the portable terminal 50 can participate in the WFD NW as a CL device. Consequently, by using the WFD NW, the portable terminal 50 sends a scan instruction with a WFD IP address "IP2" of the MFP 10D included in the response data as the destination (S24 of FIG. 10). According to this, the portable terminal 50 can send the scan instruction to the MFP 10D not via another device.

Upon receiving the scan instruction from the portable terminal 50, the MFP 10D executes the scan process (S80 of FIG. 11), and sends scan data, with the IP address of the portable terminal 50 included in the scan instruction as the destination (S82 of FIG. 11). According to this, by using the WFD NW, the MFP 10D can send the scan data to the portable terminal 50 not via another device.

(Corresponding Relationships)

In case C and case D, DS is an example of the "second communication scheme". Further, in case C1 and C2, ES is an example of the "first communication scheme". In case C1, the E-mail address of the portable terminal 50 is an example of the "particular destination information", and in case C2, the E-mail address of the PC 110 is an example of the "particular destination information". The normal Wi-Fi NW formed by the AP 100 is an example of the "particular local area network". Further, in case D, the WFD NW after the establishment of the wireless connection between the MFP 10D and the portable terminal 50 is an example of the "an other local area network". The "NFC I/F 62" and the "wireless LAN I/F 60" are respectively examples of the "first interface" and the "second interface". The process of S20 and the process of S28 of FIG. 10 are respectively examples of the "sending particular destination information" and the "receiving the particular scan data". Further, the process of S74 and the process of S82 of FIG. 11 are respectively examples of the "receiving particular destination information" and the "sending the particular scan data".

(Variant of Second Embodiment)

Moreover, in a variant, the CPU 32 may use the following method when preparing the network information corresponding to DS in S70-2 of FIG. 11. That is, in a case where the CPU 32 prepares the information included in the WFD WSI as the network information, the CPU 32 need not prepare the information included in the BT WSI as the network information. According to this configuration, since the network information does not include both the information used in the WFD NW in which the MFP 10 is the G/O device, and the BT WSI of the MFP 10, when the CPU 72 of the portable terminal 50 is to execute S24 of the application process of FIG. 10, it is not necessary to select which of the WFD NW and the BT NW is to be participated in.

Third Embodiment

Points different from the second embodiment will be described. In the present embodiment, the portable terminal 50 can execute a function confirmation process (to be described: S15 of FIG. 10) to limit the type of scan functions to be displayed by the display mechanism 54.

(Application Process of Portable Terminal 50; FIG. 10)

In the present embodiment, the response data received in S12-2 further includes a device ID of the MFP 10. The device ID is a unique ID assigned to the MFP 10 by the vendor of the MFP 10. Upon generating the display data in S14, the CPU 72 executes the function confirmation process of S15. As will be described in detail later, in the function confirmation process, characters written in the display data can be deleted (see FIG. 14). Consequently, it is possible to limit the types of scan functions displayed in S14, i.e., the types of scan functions that can be selected by the user. Other processes are the same as the second embodiment.

(Function Confirmation Process of Portable Terminal 50; FIG. 14)

The function confirmation process of S15 of FIG. 10 will be described with reference to FIG. 14. In S200, the CPU 72 determines whether information indicating DS OK is included in the response data. In a case where information indicating DS OK is included in the response data, the CPU 72 determines YES in S200, and proceeds to S202. On the other hand, in a case where information indicating DS NG is included in the response data, the CPU 72 determines NO in S200, and proceeds to S210.

In S202, the CPU 72 determines whether the MFP 10 and the portable terminal 50 are belonging to the same normal Wi-Fi NW or the same WFD NW. In a case where either the normal Wi-Fi WSI or the WFD WSI of the portable terminal 50 is not being stored in the memory 74, the CPU 72 determines NO in S202, and proceeds to S204.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S202, and proceeds to S210, and in a case where the first set is not included in the response data, the CPU 72 determines NO in S202, and proceeds to S204.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S202, and proceeds to S210, and in a case where the second set is not included in the response data, the CPU 72 determines NO in S202, and proceeds to S204.

In S204, the CPU 72 determines whether the password of the WFD WSI of the MFP 10 is included in the response data. As described above, in a case where the MFP 10 is in the G/O state, the response data includes the password of the WFD WSI of the MFP 10. In a case where the password is included in the response data, the CPU 72 determines YES in S204, and proceeds to S210, and in a case where the password is not included in the response data, the CPU 72 determines NO in S204, and proceeds to S206.

In S206, the CPU 72 determines whether the BT WSI of the MFP 10 is included in the response data. In a case where the BT WSI is included in the response data, the CPU 72 determines YES in S206, and proceeds to S210, and in a case where the BT WSI is not included in the response data, the CPU 72 determines NO in S206, and proceeds to S208.

In a case where NO is determined in any of S202, S204, and S206, a LAN to which both the MFP 10 and the portable terminal 50 are belonging is not realized, and consequently the MFP 10 and the portable terminal 50 cannot communicate scan data by using the direct communication scheme. Consequently, in S208 the CPU 72 deletes the characters indicating "direct scan" from the display data generated in S14 of FIG. 10. According to this, in S16 of FIG. 10, an image that does not include the characters indicating "direct scan" is displayed by the display mechanism 54. That is, the user cannot select "direct scan". When S208 ends, processing proceeds to S210.

In S210, the CPU 72 determines whether information indicating ES OK is included in the response data. In a case where information indicating ES OK is included in the response data, the CPU 72 determines YES in S210, and proceeds to S212. On the other hand, in a case where information indicating ES NG is included in the response data, the CPU 72 determines NO in S210, and proceeds to S216.

In S212, the CPU 72 determines whether the receiving ESI, which is the ESI for receiving E-mail, is being stored in the memory 74. In a case where the receiving ESI is being stored in the memory 74, the CPU 72 determines YES in S212, and proceeds to S216, and in a case where the receiving ESI is not being stored in the memory 74, the CPU 72 determines NO in S212, and proceeds to S214.

In a case where NO is determined in S212, the portable terminal 50 cannot receive E-mail, and consequently the MFP 10 and the portable terminal 50 cannot communicate scan data by using the E-mail communication scheme. Consequently, in S214, the CPU 72 deletes the characters indicating "E-mail scan" from the display data generated in S14 of FIG. 10. According to this, in S16 of FIG. 10, an image that does not include the characters indicating "E-mail scan" is displayed by the display mechanism 54. That is, the user cannot select "E-mail scan". When S214 ends, processing proceeds to S216.

In S216, the CPU 72 determines whether information indicating CS OK is included in the response data. In a case where information indicating CS OK is included in the response data, the CPU 72 determines YES in S216, and proceeds to S218. On the other hand, in a case where information indicating CS NO is included in the response data, the CPU 72 determines NO in S216, and ends the function confirmation process.

As described above, the response data received in S12 of FIG. 10 includes the device ID of the MFP 10. In S216, the CPU 72 sends an inquiry signal that includes the device ID of the MFP 10 to the confirmation server 130 via the wireless LAN I/F 60 or another I/F (e.g., an I/F for executing communication using a cellular network).

Upon receiving the inquiry signal that includes the device ID of the MFP 10, the confirmation server 130 determines whether a connection between the MFP 10 and the scan CL server 150 is established. For example, the confirmation server 130 supplies the device ID of the MFP 10 to the scan CL server 150, and acquires information from the scan CL server 150 indicating whether or not there is the connection. Then, the confirmation server 130 sends an inquiry result to the MFP 10 indicating connection or no-connection in accordance with the acquired information.

In S220, the CPU 72 determines whether the inquiry result received from the confirmation server 130 indicates connection. In a case where the inquiry result indicates connection, the CPU 72 determines YES in S220, and ends the function confirmation process, and in a case where the inquiry result indicates no-connection, the CPU 72 determines NO in S220, and proceeds to S222.

In the present embodiment, in order to send scan data to the scan CL server 150, the MFP 10 must be constantly connected with the scan CL server 150. Consequently, in a case where NO is determined in S220, the MFP 10 cannot send the scan data to the scan CL server 150, and consequently the MFP 10 and the portable terminal 50 cannot communicate scan data by using the cloud communication scheme. Consequently, in S222, the CPU 72 deletes the characters indicating "cloud scan" from the display data generated in S14 of FIG. 10. According to this, in S16 of FIG. 10, an image that does not include the characters indicating "cloud scan" is displayed by the display mechanism 54. That is, the user cannot select "cloud scan".

Moreover, since the MFP 10 can send the scan data to the data storage CL server 160 despite not being connected to the scan CL server 150 (i.e., NO in S220), the MFP 10 can execute CS. However, in the present embodiment, in case of being unable to receive the scan data from the MFP 10 via the scan CL server 150 (i.e., NO in S220), the portable terminal 50 determines that the MFP 10 is not capable of executing CS, and deletes the characters indicating "cloud scan" from the display data (S222). That is, in the present embodiment, unlike the first and second embodiments, CS includes the sending of scan data from the MFP 10 to the portable terminal 50, but does not include the uploading of scan data from the MFP 10 to the data storage CL server 160. When S222 ends, the function confirmation process ends.

(Specific Case; FIG. 15)

A specific case realized by processes of FIG. 10 (particularly S15) and FIG. 11 will be described with reference to FIG. 15. An MFP 10E is capable of executing normal Wi-Fi scan, ES, and CS, and is not capable of executing WFD scan and BT scan. The MFP 10E belongs to a normal Wi-Fi NW (SSID "X1", BSSID "Y1") formed by the AP 100. However, the portable terminal 50 is not belonging to the normal Wi-Fi NW (and is also not belonging to the WFD NW).

In the present case, the response data sent to the portable terminal 50 from the MFP 10E includes device ID of the MFP 10E, information indicating DS OK, information indicating ES OK, information indicating CS OK, the destination information corresponding to DS (i.e., "X1, Y1, IP1"). The portable terminal 50 generates display data representing an image that includes the characters indicating "direct scan", the characters indicating "E-mail scan", and the characters indicating "cloud scan" (S14 of FIG. 10).

Next, the portable terminal 50 executes the function confirmation process (S15 of FIG. 10). Since the portable terminal 50 is not belonging to the normal Wi-Fi NW and the WFD NW, the portable terminal 50 determines NO in S202 of FIG. 14, and since the response data does not include the password of the WFD WSI of the MFP 10E, the portable terminal 50 determines NO in S204, and since the response data does not include the BT WSI, the portable terminal 50 determines NO in S206. Consequently, the portable terminal 50 deletes the characters indicating "direct scan" from the display data (S208).

In the present case, the receiving ESI, for executing the receiving of E-mail, is being stored in the memory 74 of the portable terminal 50. Consequently, the portable terminal 50 determines YES in S212 of FIG. 14, and does not delete the characters indicating "E-mail scan" from the display data.

The portable terminal 50 sends an inquiry signal that includes the device ID of the MFP 10E to the confirmation server 130, and acquires an inquiry result from the confirmation server 130 (S218 of FIG. 14). In the present case, the scanning CSI is being stored in the memory 34 of the MFP 10E, but the MFP 10E is not connected with the scan CL server 150. For example, in a case where an expiration date of the authentication information included in the scanning CSI has expired, it may occur that the MFP 10E cannot connect with the scan CL server 150. In this case, the portable terminal 50 determines NO in S220 of FIG. 14, and deletes the characters indicating "cloud scan" from the display data (S222).

Thereby, the portable terminal 50 causes the display of an image that includes only the characters indicating "E-mail scan" (S16 of FIG. 10). Consequently, the user can select only "E-mail scan". The portable terminal 50 sends the selection result which includes an E-mail address (E1) of the portable terminal 50, which is the destination, to the MFP 10E. Consequently, the MFP 10E sends the scan data to the portable terminal 50 via the mail server 120, with E1 as the destination.

According to the present embodiment, characters indicating a communication scheme which cannot be used for sending scan data from the MFP 10E to the portable terminal 50 ("direct scan" and "cloud scan" in the case of FIG. 15) are not displayed by the portable terminal 50. Consequently, it is possible to prevent the user selecting a communication scheme which cannot be used for sending scan data. In the present embodiment, the MFP 10E and the portable terminal 50 can appropriately execute the communication of scan data by using the communication scheme selected by the user ("E-mail scan" in the case of FIG. 15).

Moreover, in the case of FIG. 15, e.g., in a case where a connection between the MFP 10E and the scan CL server 150 is established, and the MFP 10E is capable of executing BT scan, the portable terminal 50 does not delete the characters indicating "direct scan" and "cloud scan" from the display data, thus causing an image to be displayed that includes the characters indicating "direct scan", the characters indicating "E-mail scan", and the characters indicating "cloud scan" (called "case 1" below).

Further, in case 1, in a case where the MFP 10E is not capable of executing BT scan, the portable terminal 50 deletes the characters indicating "direct scan" from the display data, thus causing an image to be displayed that includes the characters indicating "E-mail scan" and the characters indicating "cloud scan" (called "case 2" below).

Further, in case 1, in a case where the memory 74 of the portable terminal 50 is not storing the receiving ESI, the portable terminal 50 deletes the characters indicating "E-mail scan" from the display data, thus causing an image to be displayed that includes the characters indicating "direct scan" and the characters indicating "cloud scan" (called "case 3" below).

Further, in case 1, in a case where a connection between the MFP 10E and the scan CL server 150 has not been established, the portable terminal 50 deletes the characters indicating "cloud scan" from the display data, thus causing an image to be displayed that includes the characters indicating "direct scan" and the characters indicating "E-mail scan" (called "case 4" below).

As shown in the case of FIG. 15 and case 1 to case 4, according to the present embodiment, the portable terminal 50 can cause an appropriate image to be displayed in accordance with the situation of the MFP 10E and the portable terminal 50.

(Corresponding Relationships)

In the case of FIG. 15, the SSID "X1" and the BSSID "Y1" included in the response data are an example of the "identification information". CS, DS, ES are respectively examples of the "first communication scheme", the "second communication scheme", and the "third communication scheme". The information included in the response data (i.e., DS OK, ES OK, CS OK) is an example of the "third data" and the "fourth data". The image displayed in the case 2 is an example of the "second image indicating the (M1-1) items of communication schemes not including the second communication scheme". Further, the image displayed in the above case 3 is an example of the "third image indicating the (M1-1) items of communication schemes not including the third communication scheme". The process of S202 and the process of S212 of FIG. 14 are respectively examples of the "determining . . . whether the terminal apparatus is belonging to the particular local area network" and the "determining whether second communication setting information . . . is stored in a memory of the terminal apparatus". The receiving ESI, which is the determination target of S212, is an example of the "second communication setting information".

(Variant of Third Embodiment)

Moreover, in a variant of FIG. 10, after having executed the function confirmation process of S15, the CPU 72 may generate the display data in S14. For example, in S208 of FIG. 14, the CPU 72 may execute a process for changing the information indicating DS OK to DS NG without deleting the characters "direct scan" from the display data. Similarly, the CPU 72 may change ES OK to ES NO in S214, and may change CS OK to CS NG in S222. Then, the CPU 72 may generate the display data in S14 by using the changed information.

Fourth Embodiment

Points different from the second embodiment will be described. In the present embodiment, the MFP 10 executes the DS function confirmation process of S40 of FIG. 11 in accordance with a flowchart different from that of FIG. 6.

(DS Function Confirmation Process; FIG. 16)

The DS function confirmation process of S40 of FIG. 11 will be described with reference to FIG. 16. In the present embodiment, in a case where the portable terminal 50 is belonging to at least one NW among the normal Wi-Fi NW and the WFD NW, the function request received in S30 of FIG. 11 includes the set of SSID and BSSID of at least one NW.

S300, S302 are the same as S41, S43 of FIG. 6. Moreover, in a case where the determination of S300 is YES, processing proceeds to S304, and in a case where the determination of S300 is NO, processing proceeds to S302. Further, upon ending S302, processing proceeds to S320. In S304, the CPU 32 determines whether the MFP 10 and the portable terminal 50 are belonging to the same normal Wi-Fi NW. In a case where the normal Wi-Fi WSI of the MFP 10 is not being stored in the memory 34, the CPU 32 determines NO in S304, and proceeds to S308.

In a case where the normal Wi-Fi WSI of the MFP 10 is being stored in the memory 34, the CPU 32 determines whether a set of SSID and BSSID (called "third set" below) which is identical to the set of normal Wi-Fi SSID and normal Wi-Fi BSSID included in the normal Wi-Fi WSI, is included in the function request. In a case where the third set is included in the function request, the CPU 32 determines YES in S304, and proceeds to S306, and in a case where the third set is not included in the function request, the CPU 32 determines NO in S304, and proceeds to S308.

In S306, the CPU 32 stores information indicating normal Wi-Fi scan OK in the memory 34. Further, in S308, the CPU 32 stores information indicating normal Wi-Fi scan NG in the memory 34. When S306 or S308 ends, processing proceeds to S310.

S310, S318 are the same as S44, S46 of FIG. 6. Moreover, in a case where the determination of S310 is YES, processing proceeds to S312, and in a case where the determination of S310 is NO, processing proceeds to S318. Further, upon ending S318, processing proceeds to S320. In S312, the CPU 32 determines whether the current state of the MFP 10 is the CL state. In a case where the current state of the MFP 10 is the CL state, the CPU 32 determines YES in S312, and proceeds to S314, and in a case where the current state of the MFP 10 is the G/O state or device state, the CPU 32 determines NO in S312, and proceeds to S316.

In S314, the CPU 32 determines whether the MFP 10 and the portable terminal 50 are belonging to the same WFD NW. In a case where the WFD WSI of the MFP 10 is being stored in the memory 34, the CPU 32 determines whether a set of SSID and BSSID (called "fourth set" below) which is identical to the set of WFD SSID and WFD BSSID included in the WFD WSI is included in the function request. In a case where the fourth set is included in the function request, the CPU 32 determines YES in S314, and proceeds to S316, and in a case where the fourth set is not included in the function request, the CPU 32 determines NO in S314, and proceeds to S318. S316 to S324 are the same as S45 to S49 of FIG. 6.

In a case where the MFP 10 and the portable terminal 50 are not belonging to the same normal Wi-Fi NW, the MFP 10 and the portable terminal 50 cannot execute communication of scan data by using the normal Wi-Fi scheme. This is because the password included in the normal Wi-Fi WSI of the MFP 10 is not sent to the portable terminal 50 from the MFP 10, and consequently the portable terminal 50 cannot participate in the normal Wi-Fi NW to which the MFP 10 is belonging. Consequently, in the present embodiment, even if the MFP 10 has the normal Wi-Fi scan function, in a case where the MFP 10 and the portable terminal 50 are not belonging to the same normal Wi-Fi NW (NO in S304), the MFP 10 stores normal Wi-Fi scan NG in the memory 34 (S308).

In a case where the MFP 10 is in the CL state and the MFP 10 and the portable terminal 50 are not belonging to the same WFD NW, the MFP 10 and the portable terminal 50 cannot execute communication of scan data by using the WFD scheme. This is because the password included in the WFD WSI of the MFP 10 is not sent from the MFP 10 to the portable terminal 50, and consequently the portable terminal 50 cannot participate in the WFD NW to which the MFP 10 is belonging. Consequently, in the present embodiment, even if the MFP 10 has the WFD scan function, in a case where the MFP 10 is in the CL state and the MFP 10 and the portable terminal 50 are not belonging to the same WFD NW (NO in S314), the MFP 10 stores WFD scan NG in the memory 34 (S318).

Thus, in the present embodiment, the MFP 10 can be caused to appropriately store information relating to the normal Wi-Fi scan (OK or NG), and information relating to WFD scan (OK or NG) in the memory 34 in accordance with the situation of the MFP 10 and the portable terminal 50. Consequently, in S70-2 of FIG. 11 the MFP 10 can appropriately determine whether it is capable of executing DS. That is, the MFP 10 determines that the MFP 10 is not capable of executing DS despite having the normal Wi-Fi scan function and the WFD scan function, and can appropriately send response data that includes information indicating DS NO to the portable terminal 50.

(Specific Case; FIG. 17)

A specific case realized by the processes of FIG. 10 and FIG. 11 (particularly S40 (FIG. 16)) will be described with reference to FIG. 17. An MFP 10F of FIG. 17 belongs to a normal Wi-Fi NW (SSID "X1", BSSID "Y1") formed by an AP 100A. Further, the MFP 10F belongs, as a CL device, to a WFD NW (SSID "X3", BSSID "Y3") formed by the PC 110. The MFP 10F is capable of executing ES and CS, but is not capable of executing BT scan. The portable terminal 50 belongs to a normal Wi-Fi NW (SSID "X2", BSSID "Y2") formed by an AP 100B different from the AP 100A.

In the present case, a function request sent from the portable terminal 50 to the MFP 10F includes a set of the normal Wi-Fi SSID "X2" and the normal Wi-Fi BSSID "Y2" included in the normal Wi-Fi WSI of the portable terminal 50. Since a set identical to the set of the normal Wi-Fi SSID "X1" and the normal Wi-Fi BSSID "Y1" included in the normal Wi-Fi WSI of the MFP 10F is not included in the function request, the MFP 10F determines NO in S304 of FIG. 16, and stores information indicating normal Wi-Fi scan NG in the memory 34 (S308). Further, since the MFP 10F has the CL state, the MFP 10F determines YES in S312 and, further, since a set identical to the set of WFD SSID "X3" and WFD BSSID "Y3" included in the WFD WSI of the MFP 10F is not included in the function request, the MFP 10F determines NO in S314, and stores information indicating WFD scan NG in the memory 34 (S318).

Consequently, the MFP 10F sends response data that includes information indicating DS NG, information indicating ES OK, and information indicating CS OK, to the portable terminal 50 (S70-2, S72 of FIG. 11). Consequently, an image that does not include "direct scan", i.e., an image that includes the characters indicating "E-mail scan" and the characters indicating "cloud scan" is displayed by the portable terminal 50. According to this, it is possible to prevent the user from selecting "direct scan" despite the portable terminal 50 and the MFP 10F not being capable of executing the communication of scan data in accordance with the direct scheme.

Then, in a case where "cloud scan" is selected by the user, the selection result includes a URL "C1" of the scan CL server 150, which is the scan data destination (S20 of FIG. 10). According to this, in the MFP 10F, the scan process is executed (S80 of FIG. 11), and the MFP 10F sends the scan data to the portable terminal 50 via the scan CL server 150 by using cloud communication (S882 of FIG. 11).

(Corresponding Relationships)

The SSID "X2" and the BSSID "Y2" included in the function request are an example of the "identification information". DS is an example of the "second communication scheme". The URL of the scan CL server 150 is an example of the "particular destination information". The process of S30 of FIG. 11 is an example of the "receiving . . . identification information". The processes of S304 and S314 of FIG. 16 are an example of the "determining . . . whether the function executing apparatus is belonging to the particular local area network".

(Variant 1)

In the above embodiments, e.g., in S16 of FIG. 4, the CPU 72 of the portable terminal 50 causes the display mechanism 54 to display communication schemes which the MFP 10 is capable of using to send scan data, and does not cause the display mechanism 54 to display communication schemes which the MFP 10 is not capable of using to send scan data. Instead, the CPU 72 may display the former communication schemes using a first color, and display the latter communication schemes using a second color different from the first color. In general terms, it is sufficient for the "first causing" of the "terminal apparatus" to display a first image indicating M1 items of communication schemes, e.g., to display the M1 items of communication schemes among the plurality of communication schemes separately from other communication schemes among the plurality of communication schemes.

(Variant 2)

In S63 of FIG. 8, the CPU 32 of the MFP 10 stores information indicating CS OK or information indicating CS NO in the memory 34 by determining whether the MFP 10 is capable of communicating with the confirmation server 130 on the Internet. Instead, the CPU 32 may determine YES in S63 in a case where the MFP 10 is connected with the AP 100 (i.e., in a case where the normal Wi-Fi WSI is being stored in the memory 34), and may determine NO in S63 in a case where the MFP 10 is not connected with the AP 100 (i.e., in a case where the normal Wi-Fi WSI is not being stored in the memory 34). The AP 100 usually comprises a function of relaying communication between the wireless LAN and the Internet. Consequently, in a case where the MFP 10 is connected with the AP 100, the MFP 10 is usually capable of executing Internet communication. Consequently, by determining whether the MFP 10 is connected with the AP 100, the CPU 32 can appropriately determine whether the MFP 10 is capable of executing Internet communication (i.e., whether the MFP 10 is capable of communicating with the scan CL server 150 and/or data storage CL server 160).

(Variant 3)

In S12 of FIG. 4, instead of receiving response data that includes information indicating DS OK, etc., the CPU 72 of the portable terminal 50 may receive response data that includes the device ID or model name of the MFP 10. In this case, the CPU 72 sends an inquiry signal that includes the device ID or model name of the MFP 10 to the confirmation server 130, and receives an inquiry result from the confirmation server 130. The confirmation server 130 is storing, in association with the device ID or model name of the MFP 10, information indicating which scan functions (DS, ES, CS) the MFP 10 is capable of executing. The information is stored in advance in the confirmation server 130 by the vendor of the MFP 10. For example, in a case where the MFP 10 does not have the ES function and the CS function, the vendor stores information indicating DS OK, ES NG, and CS NO in the confirmation server 130 in association with the device ID or model name of the MFP 10. In case of receiving an inquiry signal, from the portable terminal 50, that includes the device ID or model name of the MFP 10, the confirmation server 130 sends an inquiry result, to the portable terminal 50, that includes information indicating which scan functions (DS, ES, CS) the MFP 10 is capable of executing. The CPU 72 of the portable terminal 50 generates the display data in S14 of FIG. 3 in accordance with the inquiry result. In the present variant, also, the CPU 72 can appropriately cause the display of an image indicating the scan functions which the MFP 10 is capable of executing. In the present variant, the device ID or model name of the MFP 10 is an example of the "first information".

(Variant 4)

In variant 3, the confirmation server 130 may further store scan conditions which the MFP 10 is capable of executing (e.g., a range of scan resolutions which the MFP 10 is capable of using, etc.) in association with the device ID or model name of the MFP 10. Then, in case of receiving an inquiry signal that includes the device ID or model name of the MFP 10 from the portable terminal 50, the confirmation server 130 sends an inquiry result to the portable terminal 50 that includes information indicating which scan functions (DS, ES, CS) the MFP 10 is capable of executing and information indicating the scan conditions which the MFP 10 is capable of executing. In accordance with the inquiry result, the CPU 72 of the portable terminal 50 generates display data indicating the scan conditions included in the inquiry result. According to the present variant, the user can learn not only the scan functions which the MFP 10 is capable of executing, but also the scan conditions which the MFP 10 is capable of using.

(Variant 5)

In variant 4, in S20 of FIG. 10, the CPU 72 may send a selection result to the MFP 10 which indicates not only the scan function (e.g., "DS") selected by the user, but also user scan conditions selected by the user (e.g., scan resolution "200 Dpi"). Then, in S80 of FIG. 11, the CPU 32 of the MFP 10 may execute the scan process in accordance with the scan conditions indicated by the selection result of the user.

(Variant 6)

The "first interface" is not limited to the NFC I/F 62, but may be e.g., a TJ I/F for executing a Transfer Jet wireless communication. Moreover, in case of intending to speed up a communication speed of Transfer Jet wireless communication, the communication speed of a wireless communication via the wireless LAN I/F 60 may be slower than the communication speed of a wireless communication via the TJ I/F. That is, the communication speed of a wireless communication via the "second interface" may be faster than, or slower than, the communication speed of a wireless communication via the "first interface". In general terms, it is sufficient for a communicable range of wireless communication via the "second interface" to be greater than a communicable range of wireless communication via the "first interface".

(Variant 7)

The "function executing apparatus" is not limited to the MFP 10, but may be another communication apparatus capable of executing the scan function (scanner, FAX apparatus, copier, etc.).

(Variant 8)

In the above embodiments, in S72 of FIG. 5, in case the MFP 10 is capable of executing all of normal Wi-Fi scan, WFD scan, and BT scan, the CPU 32 of the MFP 10 sends response data that includes information indicating DS OK to the portable terminal 50. Instead, the CPU 32 may send response data to the portable terminal 50 that includes information indicating normal Wi-Fi scan OK, information indicating WFD scan OK, and information indicating BT scan OK. In this case, in S14 of FIG. 4, the CPU 72 of the portable terminal 50 may cause the display mechanism 54 to display an image that includes the characters, "normal Wi-Fi scan", "WFD scan", and "BT scan" instead of the characters indicating "direct scan". In the present variant, "normal Wi-Fi scan", "WFD scan", and "BT scan" are examples of the "communication schemes".

(Variant 9)

In the above embodiments, the wireless network is formed by the MFP 10 and the portable terminal 50 executing WFD communication. Instead, by activating a so-called Soft AP, the CPU 32 of the MFP 10 may form a wireless network in which the MFP 10 operates as an AP.

(Variant 10)

In the above embodiments, when a WFD NW is to be newly formed, the MFP 10 becomes the G/O device. Instead, the portable terminal 50 may become the G/O device. Further, by activating a so-called Soft AP, the CPU 72 of the portable terminal 50 may form a wireless network in which the portable terminal 50 operates as an AP.

(Variant 11)

In the above embodiments, the processes of FIG. 4, FIG. 5, etc. are realized by the CPUs 32, 72 of the MFP 10 and the portable terminal 50 executing programs (i.e., software) within the memories 34, 74. Instead, at least one of the processes may be realized by hardware such as a logic circuit, etc.

What is claimed is:

1. A non-transitory computer-readable storage medium storing computer-readable instructions for a terminal apparatus, wherein the computer-readable instructions, when executed by a processor of the terminal apparatus, cause the terminal apparatus to perform:
   receiving first information relating to a first function executing apparatus from the first function executing apparatus, the first function executing apparatus being configured to execute a scan function;
   causing a display mechanism of the terminal apparatus to display a first image indicating M1 items of communication schemes by using the first information, the M1 being an integer of one or more, each of the M1 items of communication schemes being a communication scheme available for the first function executing apparatus to send scan data;
   sending particular destination information corresponding to a first communication scheme to the first function executing apparatus in a case where the first communication scheme is selected from among the M1 items of communication schemes indicated in the first image, the particular destination information indicating a destination to which the first function executing apparatus sends particular scan data to the terminal apparatus in accordance with the first communication scheme; and
   receiving the particular scan data from the first function executing apparatus in accordance with the first communication scheme in a case where the first communication scheme is selected from among the M1 items of communication schemes.

2. The non-transitory computer-readable storage medium as in claim 1, wherein the first information includes data indicating that the first function executing apparatus is configured to use the M1 items of communication schemes, and the causing includes generating display data by using the first information and template data stored in a memory of the terminal apparatus, so as to cause the display mechanism to display the first image by supplying the display data representing the first image to the display mechanism.

3. The non-transitory computer-readable storage medium as in claim 1, wherein each of the M1 items of communication schemes is a communication scheme using a communication protocol different from each other.

4. The non-transitory computer-readable storage medium as in claim 1, wherein the first information includes: first data indicating that the first function executing apparatus is configured to use the M1 items of communication schemes including the first communication scheme in a case where first communication setting information for a communication via the internet is stored in a memory of the first function executing apparatus; and second data indicating that the first function executing apparatus is configured to use the M1 items of communication schemes not including the first communication scheme in a case where the first communication setting information is not stored in the memory of the first function executing apparatus, the first communication scheme is a communication scheme in which the first function executing apparatus sends scan data via the internet, and the causing includes:
   causing the display mechanism to display the first image indicating the M1 items of communication schemes including the first communication scheme in a case where the first information includes the first data; and
   causing the display mechanism to display the first image indicating the M1 items of communication schemes not including the first communication scheme in a case where the first information includes the second data.

5. The non-transitory computer-readable storage medium as in claim 1, wherein the first information includes:
   first data indicating that the first function executing apparatus is configured to use the M1 items of communication schemes including the first communication scheme in a case where the first function executing apparatus receives a response by sending a signal to a server on the internet; and
   second data indicating that the first function executing apparatus is configured to use the M1 items of communication schemes not including the first communication scheme in a case where the first function executing apparatus does not receive the response despite sending the signal to the server,
   the first communication scheme is a communication scheme in which the first function executing apparatus sends scan data via the internet, and the causing includes:
   causing the display mechanism to display the first image indicating the M1 items of communication schemes including the first communication scheme in a case where the first information includes the first data; and
   causing the display mechanism to display the first image indicating the M1 items of communication schemes not including the first communication scheme in a case where the first information includes the second data.

6. The non-transitory computer-readable storage medium as in claim 1, wherein in a case where the first information includes third data indicating that the first function executing apparatus is configured to use the M1 items of communication schemes including a second communication scheme, the first information further includes identification information to identify a particular local area network to which the first function executing apparatus belongs,
   the second communication scheme is a communication scheme in which the first function executing apparatus sends scan data not via the internet by using a local area network,
   the computer-readable instructions cause the terminal apparatus to further perform determining, by using the identification information, whether the terminal apparatus belongs to the particular local area network, and the causing includes:
   causing the display mechanism to display the first image indicating the M1 items of communication schemes including the second communication scheme in a case where it is determined that the terminal apparatus belongs to the particular local area network; and causing the display mechanism to display a second image indicating (M1-1) items of communication schemes not including the second communication scheme in a case where it is determined that the terminal apparatus does not belong to the particular local area network.

7. The non-transitory computer-readable storage medium as in claim 1, wherein the first information includes fourth data indicating that the first function executing apparatus is configured to use the M1 items of communication schemes including a third communication scheme, the third communication scheme is a communication scheme in which the first function executing apparatus sends scan data via the internet, the computer-readable instructions cause the terminal apparatus to further perform determining whether second communication setting information for a communication via the internet is stored in a memory of the terminal apparatus, and the causing includes:

causing the display mechanism to display the first image indicating the M1 items of communication schemes including the third communication scheme in a case where it is determined that the second communication setting information is stored in the memory of the terminal apparatus; and causing the display mechanism to display a third image indicating (M1-1) items of communication schemes not including the third communication scheme in a case where it is determined that the second communication setting information is not stored in the memory of the terminal apparatus.

8. The non-transitory computer-readable storage medium as in claim 1, wherein the computer-readable instructions cause the terminal apparatus to further perform:

receiving, from a second function executing apparatus different from the first function executing apparatus, second information relating to M2 items of communication schemes available for the second function executing apparatus to send scan data, the second function executing apparatus configured to execute a scan function, the M2 being an integer of two or more, the M2 communication schemes including a fourth communication scheme and a fifth communication scheme being different from the fourth communication scheme, causing the display mechanism to display, by using the second information, a fourth image including M2 items of character strings, each of the M2 items of character strings indicating each of the M2 items of communication schemes, the M2 items of character strings including a third character string indicating the fourth communication scheme and a fourth character string, which is different from the third character string, indicating the fifth communication scheme, and the M2 items of communication schemes are different from the M1 items of communication schemes.

9. The non-transitory computer-readable storage medium as in claim 1, wherein the particular destination information indicates a destination to which the first function executing apparatus sends the particular scan data to a device different from the terminal apparatus in accordance with the first communication scheme.

10. The non-transitory computer-readable storage medium as in claim 1, wherein the receiving of the particular scan data includes:

receiving the particular scan data from the first function executing apparatus via the internet in accordance with the first communication scheme in the case where the first communication scheme is selected from among the M1 items of communication schemes, and receiving the particular scan data from the first function executing apparatus not via the internet in accordance with a second communication scheme different from the first communication scheme in a case where the second communication scheme is selected from among the M1 items of communication schemes.

11. The non-transitory computer-readable storage medium as in claim 1, wherein the receiving the particular scan data includes:

receiving the particular scan data from the first function executing apparatus by using a particular local area network, in a case where a second communication scheme is selected from among the M1 items of communication schemes and the first information is received in a state where the particular local area network is being formed, the particular local area network being a network to which both the terminal apparatus and the first function executing apparatus belong; and newly establishing a wireless connection between the terminal apparatus and the first function executing apparatus so as to receive the particular scan data from the first function executing apparatus by using another local area network which has been formed by newly establishing the wireless connection, in a case where the second communication scheme is selected from among the M1 items of communication schemes and the first information is received in a state where the particular local area network is not being formed, the another local area network being a network to which both the terminal apparatus and the first function executing apparatus belong, and the second communication scheme is a communication scheme in which the first function executing apparatus sends scan data not via the internet by using a local area network.

12. The non-transitory computer-readable storage medium as in claim 1, further comprising:

a first interface configured to execute a wireless communication; and a second interface configured to execute a wireless communication, wherein a communicable range of a wireless communication via the second interface is larger than a communicable range of a wireless communication via the first interface, the receiving of the first information includes receiving the first information from the first function executing apparatus via the first interface, and the receiving of the particular scan data includes receiving the particular scan data from the first function executing apparatus via the second interface.

13. The non-transitory computer-readable storage medium as in claim 1, wherein the terminal apparatus further comprises:

a first interface configured to execute a wireless communication; and a second interface configured to execute a wireless communication, the second interface being different from the first interface,
    the receiving includes receiving the first information from the first function executing apparatus using the first interface,
each of the M1 communication schemes is a communication scheme not using the first interface, and at least one of the M1 communication schemes is a communication scheme using the second interface.

14. A function executing apparatus configured to execute a scan function, the function executing apparatus comprising:
    a processor; and
    a memory storing computer-readable instructions therein, the computer-readable instructions, when executed by the processor, causing the function executing apparatus to perform:
        specifying M1 items of communication schemes from among a plurality of communication schemes, the M1 being an integer of one or more, each of the M1 items of communication schemes being a communication scheme available for the function executing apparatus to send scan data;
        sending first information indicating the M1 items of communication schemes to a terminal apparatus;
        receiving particular destination information corresponding to a first communication scheme from the terminal apparatus after sending the first information, the particular destination information indicating a destination to which the function executing apparatus sends particular scan data to the terminal apparatus in accordance with the first communication scheme; and
        sending the particular scan data to the terminal apparatus in accordance with the first communication scheme after receiving the particular destination information.

15. The function executing apparatus as in claim 14, wherein the specifying includes:
    specifying the M1 items of communication schemes including the first communication scheme in a case where first communication setting information for a communication via the internet is stored in a memory of the function executing apparatus; and
    specifying the M1 items of communication schemes not including the first communication scheme in a case where the first communication setting information is not stored in the memory of the function executing apparatus, and
    the first communication scheme is a communication scheme in which the function executing apparatus sends scan data via the internet.

16. The function executing apparatus as in claim 14, wherein the specifying includes:
    specifying the M1 items of communication schemes including the first communication scheme in a case of sending a signal to a server on the internet and receiving a response; and
    specifying the M1 items of communication schemes not including the first communication scheme in a case of not receiving the response despite sending the signal to the server, and
    the first communication scheme is a communication scheme in which the function executing apparatus sends scan data via the internet.

17. The function executing apparatus as in claim 14, wherein the computer-readable instructions cause the function executing apparatus to further perform:
    receiving, from the terminal apparatus, identification information to identify a particular local area network to which the terminal apparatus belongs; and
    determining, by using the identification information, whether the function executing apparatus belongs to the particular local area network,
    wherein the specifying includes:
    specifying the M1 items of communication schemes including a second communication scheme in a case where it is determined that the function executing apparatus belongs to the particular local area network; and
    specifying the M1 items of communication schemes not including the second communication scheme in a case where it is determined that the function executing apparatus does not belong to the particular local area network, and
    the second communication scheme is a communication scheme in which the function executing apparatus sends scan data not via the internet by using a local area network.

18. The function executing apparatus as in claim 14, wherein the computer-readable instructions cause the function executing apparatus to further perform:
    receiving particular destination information corresponding to the first communication scheme from the terminal apparatus in a case where the first communication scheme is selected from among the M1 items of communication schemes on the terminal apparatus,
    the particular destination information indicating a destination to which the function executing apparatus sends particular scan data in accordance with the first communication scheme; and
    sending the particular scan data to a destination indicated by the particular destination information in accordance with the first communication scheme.

* * * * *